United States Patent
Sharp

(10) Patent No.: US 11,226,482 B2
(45) Date of Patent: *Jan. 18, 2022

(54) REVERSE-ORDER CROSSED PANCAKE LENS WITH AZIMUTHAL COMPENSATION

(71) Applicant: Facebook Technologies, LLC, Menlo Park, CA (US)

(72) Inventor: Gary Dean Sharp, Boulder, CO (US)

(73) Assignee: Facebook Technologies, LLC, Menlo Park, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/159,747

(22) Filed: Oct. 15, 2018

(65) Prior Publication Data

US 2019/0377182 A1  Dec. 12, 2019

Related U.S. Application Data

(60) Provisional application No. 62/682,041, filed on Jun. 7, 2018.

(51) Int. Cl.
*G02B 27/01* (2006.01)
*G02B 27/00* (2006.01)
(Continued)

(52) U.S. Cl.
CPC ....... *G02B 27/0018* (2013.01); *G02B 5/3058* (2013.01); *G02B 5/3066* (2013.01);
(Continued)

(58) Field of Classification Search
CPC .............. G02B 27/0018; G02B 5/3058; G02B 5/3066; G02B 5/3083; G02B 27/0025;
(Continued)

(56) References Cited

U.S. PATENT DOCUMENTS 3,183,763 A    5/1965  Koester
3,432,225 A *  3/1969  Rock ................... C03C 17/3417
                                                           359/588
(Continued)

FOREIGN PATENT DOCUMENTS

JP    H11-237584 A    8/1999
JP    H11237584 A     8/1999
(Continued)

OTHER PUBLICATIONS

Cranston et al. "Birefringence in spin-coated films containing cellulose nanocrystals" Colloids and Surfaces A: Physicochem. Eng. Aspects, vol. 325, pp. 44-51 (Year: 2008).*

(Continued)

*Primary Examiner* — George G King

(74) *Attorney, Agent, or Firm* — FisherBroyles, LLP

(57) ABSTRACT

In various embodiments, a pancake lens block (e.g., a reverse order crossed pancake lens block) including azimuthal compensation may include an optical element configured to transmit at least a portion of light emitted by an electronic display. The pancake lens block may further include an azimuthal compensator coupled to a surface of the optical element. Moreover, the azimuthal compensator may include a uniaxial birefringent material, and the azimuthal compensator may be configured to reduce an optical effect of stress birefringence in the optical element.

16 Claims, 11 Drawing Sheets

(51) Int. Cl.
*G02B 5/30* (2006.01)
*G02B 27/28* (2006.01)
*G02B 27/09* (2006.01)

(52) U.S. Cl.
CPC ....... *G02B 5/3083* (2013.01); *G02B 27/0025* (2013.01); *G02B 27/0037* (2013.01); *G02B 27/0093* (2013.01); *G02B 27/0172* (2013.01); *G02B 27/0983* (2013.01); *G02B 27/283* (2013.01); *G02B 27/286* (2013.01)

(58) Field of Classification Search
CPC ............ G02B 27/0037; G02B 27/0093; G02B 27/0172; G02B 27/0983; G02B 27/283; G02B 27/286
See application file for complete search history.

(56) References Cited

U.S. PATENT DOCUMENTS

| | | | |
|---|---|---|---|
| 3,479,168 | A | 11/1969 | Bird et al. |
| 5,349,379 | A | 9/1994 | Eichenlaub |
| 5,410,345 | A | 4/1995 | Eichenlaub |
| 5,428,366 | A | 6/1995 | Eichenlaub |
| 5,966,242 | A | 10/1999 | Yamanaka |
| 5,973,760 | A | 10/1999 | Dehmlow |
| 6,583,930 | B1 | 6/2003 | Schrenk et al. |
| 7,662,436 | B1 | 2/2010 | Wei et al. |
| 8,780,039 | B2 | 7/2014 | Gay et al. |
| 8,780,285 | B1 | 7/2014 | Stuppi et al. |
| 9,110,245 | B2 | 8/2015 | Derks et al. |
| 9,513,420 | B2 | 12/2016 | Derks et al. |
| 9,555,589 | B1 * | 1/2017 | Ambur .............. G02B 27/0172 |
| 2002/0169267 | A1 | 11/2002 | Minakuchi et al. |
| 2003/0086171 | A1 * | 5/2003 | McGuire ............ G03F 7/70075 359/489.15 |
| 2004/0125291 | A1 | 7/2004 | Kawahara et al. |
| 2005/0179048 | A1 | 8/2005 | Yamanaka et al. |
| 2006/0146682 | A1 | 7/2006 | Sharp |
| 2006/0159958 | A1 | 7/2006 | Lee |
| 2006/0268207 | A1 | 11/2006 | Tan et al. |
| 2007/0070508 | A1 | 3/2007 | Ruhle et al. |
| 2007/0159582 | A1 | 7/2007 | Kwok et al. |
| 2007/0279553 | A1 | 12/2007 | Yoda et al. |
| 2008/0297898 | A1 | 12/2008 | Martin |
| 2010/0177113 | A1 | 7/2010 | Gay et al. |
| 2011/0193814 | A1 | 8/2011 | Gay et al. |
| 2012/0120365 | A1 | 5/2012 | Legerton et al. |
| 2013/0057958 | A1 | 3/2013 | Minoura et al. |
| 2014/0293142 | A1 | 10/2014 | Kawazu et al. |
| 2014/0327861 | A1 * | 11/2014 | Huang ................ G02F 1/1333 349/96 |
| 2016/0011353 | A1 | 1/2016 | Escuti et al. |
| 2016/0070104 | A1 | 3/2016 | Vang |
| 2016/0131920 | A1 | 5/2016 | Cook |
| 2017/0045737 | A1 | 2/2017 | Cammenga et al. |
| 2017/0068029 | A1 | 3/2017 | Yun et al. |
| 2017/0068096 | A1 | 3/2017 | Ouderkirk et al. |
| 2017/0168302 | A1 | 6/2017 | McDowall et al. |
| 2017/0255015 | A1 | 9/2017 | Geng et al. |
| 2017/0269368 | A1 | 9/2017 | Yun et al. |
| 2017/0276960 | A1 | 9/2017 | Osterman et al. |
| 2017/0358136 | A1 | 12/2017 | Gollier et al. |
| 2018/0031835 | A1 | 2/2018 | Hoppe |
| 2018/0039052 | A1 | 2/2018 | Khan et al. |
| 2018/0059296 | A1 | 3/2018 | Ouderkirk et al. |
| 2018/0101020 | A1 | 4/2018 | Gollier et al. |
| 2018/0120579 | A1 | 5/2018 | Gollier et al. |
| 2018/0149862 | A1 | 5/2018 | Kessler et al. |

FOREIGN PATENT DOCUMENTS

| | | | |
|---|---|---|---|
| JP | 2009-238363 | A | 10/2009 |
| JP | 2009238363 | A | 10/2009 |
| JP | 2012-247748 | A | 12/2012 |
| JP | 2012247748 | A | 12/2012 |
| JP | 5147910 | B2 | 2/2013 |
| JP | 2013-200482 | A | 10/2013 |
| JP | 2013200482 | A | 10/2013 |
| JP | 2015-184629 | A | 10/2015 |
| JP | 2015184629 | A | 10/2015 |
| WO | 94/06249 | A1 | 3/1994 |
| WO | 2018/093633 | A1 | 5/2018 |
| WO | 2018093633 | A1 | 5/2018 |

OTHER PUBLICATIONS

Chen et al. "Special positive birefringence properties of mesogen-jacketed liquid crystalline polymer films for optical compensators" Polymer Chemistry, vol. 1, pp. 430-433 (Year: 2010).*

Wikipedia page "Lens" (Year: 2018).*

Min et al. "Dynamic measurement of stress optical behavior of three amorphous polymers" Korea-Australia Rheology Journal vol. 24, No. 1, pp. 73-79 (Year: 2012).*

Escuti et al., "Geometric-Phase Holograms", Optics & Photonics News, Feb. 2016, 8 pages.

Pancharatnam, S., "Generalized Theory of Interference, and its Applications", Part I, Coherent Pencils, Memoir No. 88 of the Raman Research Institute, Oct. 30, 1956, pp. 247-262, Bangalore, India.

3M Optical Systems, "Vikuiti Dual Brightness Enhancement Film—Matte (DBEF-M)", URL: multimedia.3m.com/mws/media/152671O/vikuiti-tm-dbef-m.pdf, 2008, 4 pages.

International Search Report and Written Opinion received for PCT Application Serial No. PCT/US2018/064362 dated Mar. 29, 2019, 11 pages.

International Search Report and Written Opinion received for PCT Application Serial No. PCT/US2018/064363 dated Mar. 28, 2019, 18 pages.

Sharp, Gary Dean, "Head Mounted Display Including A Reverse-Order Crossed Pancake Lens", U.S. Appl. No. 16/160,128, filed Oct. 15, 2018, 95 pages.

Sharp, Gary Dean, "Reverse-Order Crossed Pancake Lens With A Shaped Polarizer", U.S. Appl. No. 16/159,752, filed Oct. 15, 2018, 87 pages.

Sharp, Gary Dean, "Reverse-Order Crossed Pancake Lens With Index Gradient Structure", U.S. Appl. No. 16/159,757, filed Oct. 15, 2018, 91 pages.

International Search Report and Written Opinion received for PCT Application Serial No. PCT/US2018/064366 dated Apr. 3, 2019, 18 pages.

Extended European Search Report received for EP Patent Application Serial No. 18921861.3 dated Jun. 11, 2021, 13 pages.

Extended European Search Report received for EP Patent Application Serial No. 18921615.3 dated Jun. 18, 2021, 11 pages.

Extended European Search Report received for EP Patent Application Serial No. 18921577.5 dated Jun. 7, 2021, 13 pages.

Cai et al., "Recent advances in antireflective surfaces based on nanostructure arrays", Mater. Horiz , vol. 2, No. 1, Jan. 1, 2015, pp. 37-53.

Lee, Michelle, "Moth Eyes: A New Vision for Light-Harnessing Efficiency", Remarkable Natural Material Surfaces and Their Engineering Potential, Springer, Jan. 1, 2014, pp. 79-89.

Extended European Search Report received for EP Patent Application Serial No. 18921964.5 dated Jun. 28, 2021, 15 pages.

Li et al., "Liquid Crystalline Epoxy Resins", Chapter 1, Liquid Crystalline Polymers, Springer, Jan. 1, 2016, pp. 1-17.

Wikipedia, "Pancake lens", URL: https://en.wikipedia.org/w/index.php?title=Pancake_lens&oldid=822604383, Jan. 27, 2018, 4 pages.

Notice of Allowance received for U.S. Appl. No. 16/159,752 dated Jul. 15, 2021, 22 pages.

Anonymous, "Pancake Lens—Wikipedia," Jan. 27, 2018, 4 pages, XP055812890, Retrieved from the Internet: URL:https://en.wikipedia.org/w/index.php?title=Pancake_lens&oldid=822604383 [Retrieved on Jun. 11, 2021].

(56) References Cited

OTHER PUBLICATIONS

Cai J., et al., "Recent Advances in Antireflective Surfaces Based on Nanostructure Arrays," Materials Horizons, Oct. 12, 2015, vol. 2 (1), pp. 37-53, XP055375441, ISSN: 2051-6347, DOI: 10.1039/C4MH00140K.
Extended European Search Report for European Application No. 18921577.5, dated Jun. 7, 2021, 12 Pages.
Extended European Search Report for European Application No. 18921615.3, dated Jun. 18, 2021, 11 Pages.
Extended European Search Report for European Application No. 18921861.3, dated Jun. 11, 2021, 13 Pages.
Extended European Search Report for European Application No. 18921964.5, dated Jun. 28, 2021, 15 Pages.
International Preliminary Report on Patentability for International Application No. PCT/US2018/064361, dated Dec. 17, 2020, 7 Pages.
International Preliminary Report on Patentability for International Application No. PCT/US2018/064362, dated Dec. 17, 2020, 6 Pages.
International Preliminary Report on Patentability for International Application No. PCT/US2018/064363, dated Dec. 17, 2020, 12 Pages.
International Preliminary Report on Patentability for International Application No. PCT/US2018/064366, dated Dec. 17, 2020, 12 Pages.
International Search Report and Written Opinion for International Application No. PCT/US2018/064361, dated May 2, 2019, 11 Pages.
Lee M., "Moth Eyes: A New Vision for Light-Harnessing Efficiency," Remarkable Natural Material Surfaces and Their Engineering Potential, Jan. 1, 2014, pp. 79-89, XP055808076, ISBN: 978-3-319-03125-5, DOI: 10.1007/978-3-319-03125-57.
Li Y., et al., "Liquid Crystalline Epoxy Resins," Liquid Crystalline Polymers, Jan. 1, 2016, 17 pages, XP055812748.
Notice of Allowance dated Jul. 15, 2021 for U.S. Appl. No. 16/159,752, filed Oct. 15, 2018, 22 Pages.
Pancharatnam S., "Achromatic Combinations of Birefringent Plates," Part II. An Achromatic Quarter-Wave Plate, Proceedings of the Indian Academy of Sciences, Mar. 5, 1955, pp. 137-144.
"Polarizer," Wikipedia Webpage, Apr. 28, 2018 [Retrieved on Mar. 9, 2021], 15 pages.

\* cited by examiner

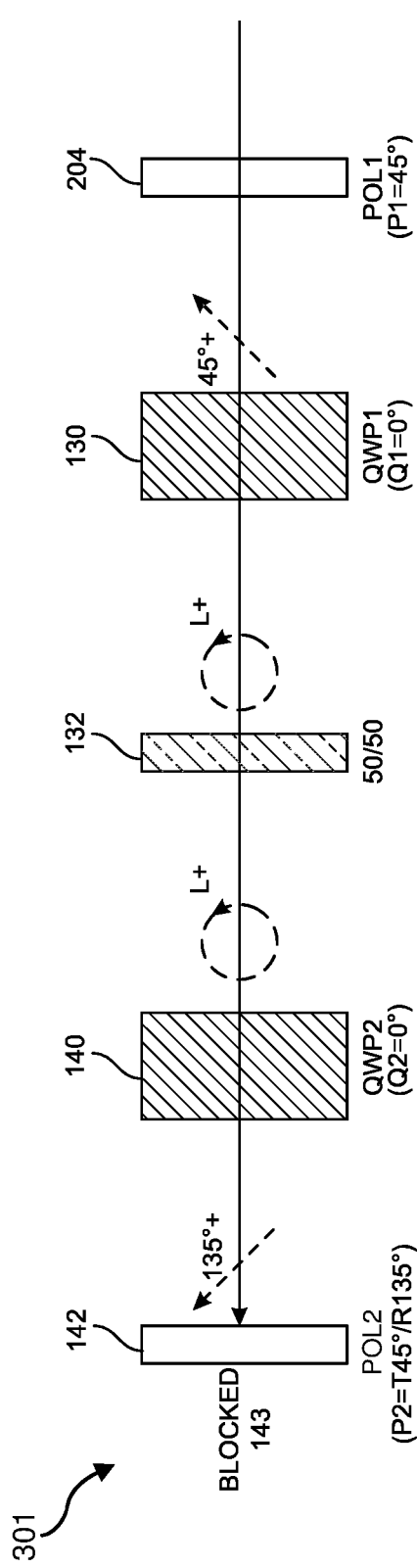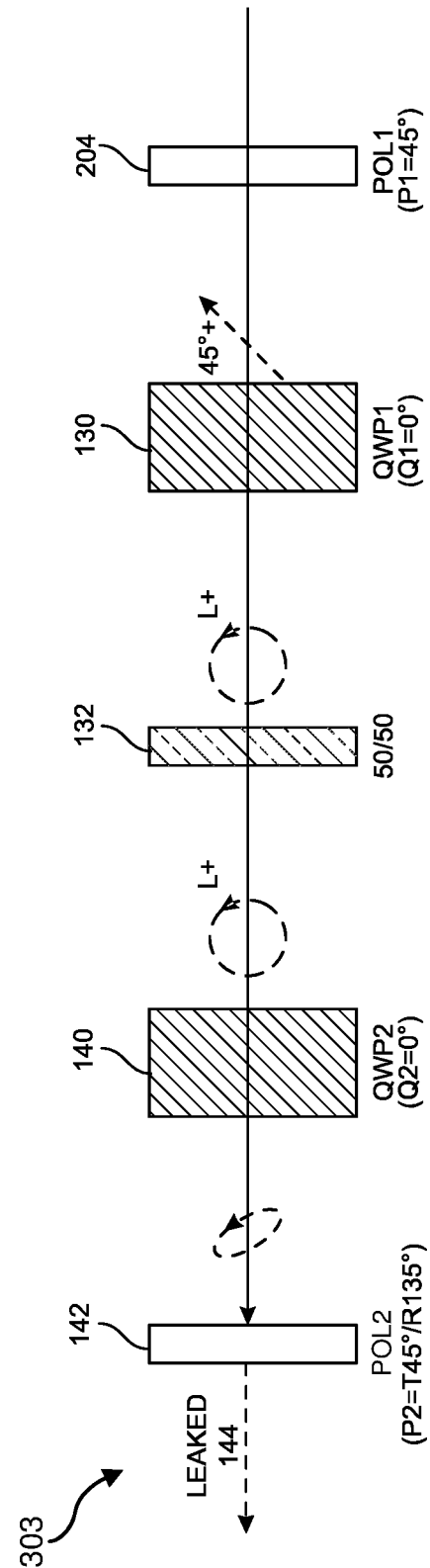

REVERSE-ORDER CROSSED PANCAKE LENS WITH AZIMUTHAL COMPENSATION

CROSS REFERENCE TO RELATED APPLICATION

This application is a non-provisional utility application which claims the benefit of U.S. Provisional Application No. 62/682,041 filed 7 Jun. 2018, the disclosure of which is incorporated, in its entirety, by this reference.

BACKGROUND

In a head-mounted display (HMD), a user's eye typically occupies a region of space generally referred to as an eye box, and a respective eye box may be provided for each of the user's eyes. HMDs often display and direct content to the eye boxes, for example, using one or more optical elements. Unfortunately, light reflected between the various optical elements within the HMD may generate parasitic light in the process. This may lead to reduced contrast in the content being presented to the user. In particular, systems with polarizing elements may introduce parasitic light and/or ghost images that may reduce image quality and, thus, the user's overall experience.

SUMMARY

In various embodiments, a pancake lens block is described. The pancake lens block may include (i) an optical element configured to transmit at least a portion of radiation from a radiation source, and (ii) an azimuthal compensator coupled to a surface of the optical element. Further, the azimuthal compensator may include a uniaxial birefringent material and the azimuthal compensator may be configured to reduce an optical effect of stress birefringence in the optical element.

In some embodiments, the optical element of the pancake lens block may include (i) a first retarder oriented to a first axis of orientation, where the first retarder may be configured to selectively transmit a portion of the radiation from the radiation source, (ii) a partial reflector that receives the portion of radiation from the first retarder and transmits the portion of radiation, (iii) a second retarder oriented to a second axis of orientation that may be substantially orthogonal to the first axis of orientation, where the second retarder may be configured to transmit the portion of radiation from the partial reflector, and (iv) a reflective polarizer configured to reflect the portion of radiation transmitted by the second retarder back to the partial reflector through the second retarder and the partial reflector reflects a second portion of the radiation from the second retarder back to the reflective polarizer.

Further, the azimuthal compensator may be coupled to a surface of the partial reflector and may be coupled to a surface of the second retarder. Further, the azimuthal compensator may be configured to reduce an optical effect of stress birefringence in at least one of the partial reflector or the second retarder. In at least one embodiment, the second retarder or the partial reflector may include a plastic lens. Additionally, the plastic lens may be fabricated using an injection molding process. In one aspect, the plastic lens may include a material with a high stress optical coefficient. In some embodiments, the azimuthal compensator may have a fast axis that may be oriented in a direction perpendicular to a radius of the azimuthal compensator and a slow axis that may be parallel to the radius of the azimuthal compensator.

Further, an amount of retardation provided by the azimuthal compensator may increase with an increasing radius of the azimuthal compensator. In at least one embodiment, the azimuthal compensator may have a maximum thickness that may be approximately equal to a thickness of the plastic lens.

In various embodiments, the azimuthal compensator may be fabricated using a non-uniform spin coating process. The non-uniform spin coating process may include (i) dispensing a fluid from a fluid source onto a surface of a substrate at a first radial position while spinning the substrate at a first angular velocity, and (ii) dispensing the fluid from the fluid source onto the substrate's surface at a second radial position while spinning the substrate at a second angular velocity. Further, the fluid may include a volatile and a nonvolatile component, and the volatile component may evaporate from the substrate's surface yielding a film on the substrate's surface, the film including the nonvolatile component. In at least one embodiment, the azimuthal compensator may include a layer having a differential thickness in a radial direction and the azimuthal compensator may be fabricated using a reactive mesogen. The reactive mesogen may include at least one of an acrylate, a methacrylate, an epoxy, an oxetane, a vinyl-ether, a styrene, or a thiol. The reactive mesogen may be cured by a second radiation source such that the reactive mesogen's pre-tilt changes with increasing radius of the layer.

In some aspects, a head mounted display may include an electronic display configured to emit light and a pancake lens block. The pancake lens block may include an optical element configured to transmit at least a portion of the light emitted by the electronic display and an azimuthal compensator coupled to a surface of the optical element. Moreover, the azimuthal compensator may include a uniaxial birefringent material, and the azimuthal compensator may be configured to reduce an optical effect of stress birefringence in the optical element. In at least one embodiment, the azimuthal compensator may have a fast axis that may be oriented in a direction perpendicular to a radius of the azimuthal compensator and a slow axis that may be parallel to the radius of the azimuthal compensator.

A method of assembling a pancake lens block may include positioning an optical element to transmit at least a portion of light from a radiation source, and coupling an azimuthal compensator to a surface of the optical element. Moreover, the azimuthal compensator may include a uniaxial birefringent material, and the azimuthal compensator may be configured to reduce an optical effect of stress birefringence in the optical element. In some embodiments, the method may further include fabricating the azimuthal compensator using a non-uniform spin coating process. The method further may include fabricating the azimuthal compensator using a reactive mesogen, the fabricated azimuthal compensator including a layer having a differential thickness in a radial direction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying figures and appendices illustrate a number of exemplary embodiments and are a part of the specification. Together with the following description, these figures and appendices demonstrate and explain various principles of the instant disclosure.

FIG. 3B shows an exemplary pancake lens block configuration (aligned to produce polarization leakage with wavelength and ray angle) that blocks light during a first see-through path at the designed wavelength (so both waveplates serve as quarter-waveplates), in accordance with one embodiment.

FIG. 3C shows an exemplary pancake lens block configuration (aligned to produce the polarization leakage with wavelength and ray angle) that leaks light during a first see-through path for another wavelength (so both waveplates do not serve as quarter-waveplates), in accordance with one embodiment.

Figure 1:
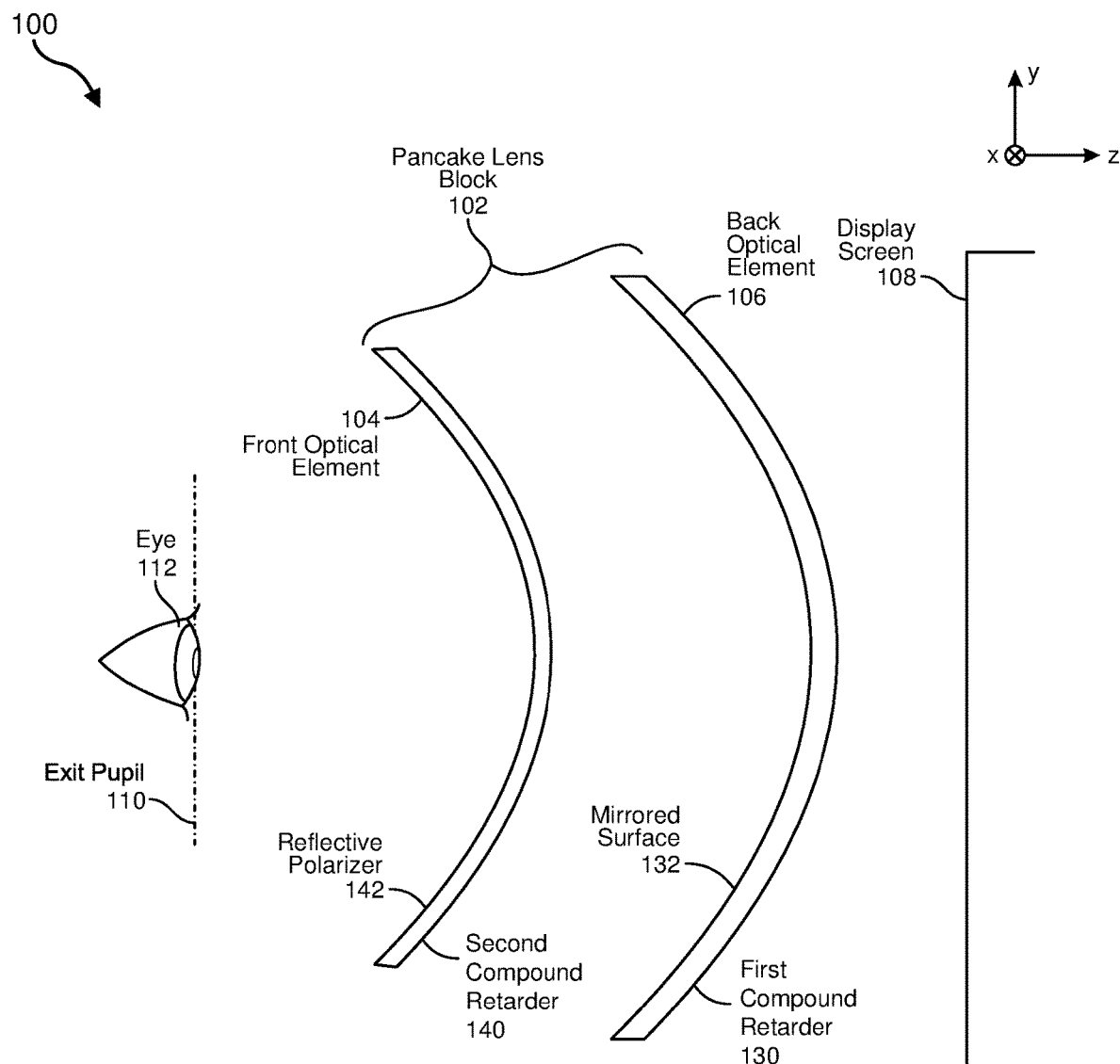
FIG. 1 shows an example pancake lens block, in accordance with one embodiment.

Throughout the figures, identical reference characters and descriptions indicate similar, but not necessarily identical, elements. While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, equivalents, and alternatives falling within this disclosure.

DETAILED DESCRIPTION OF EXEMPLARY EMBODIMENTS

The present disclosure is generally directed to enhancing images from electronic displays, and more specifically to reducing light leakage within an optical system including electronic displays.

In some embodiments, a reverse-order crossed (ROC) architecture for a pancake lens may include a first polarizer (e.g., linear polarizer), a first compound retarder (e.g., a retarder including multiple individual retarders, such as quarter-wave plates (QWPs)), a partial reflector, a second compound retarder (e.g., a retarder including multiple QWPs), and a reflective (e.g., beam-splitting) polarizer. In some embodiments, the term "compound retarder" may refer to an engineered stack of retarders (e.g., linear retarders), where the retardation and orientation of each layer in the stack may be designed to transform radiation (e.g., light) of a particular input polarization to radiation of a prescribed output polarization as a function of wavelength. Light received (e.g., from a display) may propagate through the pancake lens, where the light may undergo multiple controlled reflections and transmissions achieved by coordinating changes in polarization of light through these optical elements. In some embodiments, the first compound retarder and the second compound retarder may include a plurality of retarders (e.g., retarders including QWPs), for example, two, three, four, or more retarders.

The term "compound retarder" can be used to describe an engineered stack of linear retarders that may serve to generate a specified polarization transformation as a function of wavelength. In some instances, the compound retarder may serve to convert a uniform linear state of polarization (SOP) to a uniform circular SOP. The term may be used to encompass all such structures, without the additional constraint that the structure behave as a composite linear retarder (i.e. that it have linear eigen-polarizations).

In some embodiments, to prevent parasitic light (e.g., ghost images) from degrading image quality, an optical axis (e.g., a fast axis or a slow axis) of the second compound retarder may be oriented approximately ninety degrees (orthogonal) relative to the optical axis of the first compound retarder (i.e., corresponding to the "cross" configuration designation of the reverse-order crossed pancake lens block). Further, the first compound retarder and the second compound retarder may each include multiple retarders (e.g., three QWPs) arranged in a stack. In some embodiments, the order of the multiple retarding elements (e.g., QWPs) included in the first compound retarder-stack and the order for the multiple retarding elements for the second compound retarder-stack may be the reverse of one another, yielding the "reverse-order" configuration nomenclature of the ROC. For example, first, second, and third QWPs (e.g., labeled as A, B, and C) in the first compound retarder may map to third, second, and first QWPs (e.g., labeled as C, B, and A) in the second compound retarder.

In some embodiments, the ROC architecture may be implemented independently of the retardation magnitude or the axis of orientation of any given retarding element (e.g., any given QWP) of the compound retarder elements. In some embodiments, the optical axis of orientation of the retarders (e.g., the QWPs) in the compound retarders may be the fast axis (e.g., corresponding to the optical axis of orientation for a retarder including a negative uniaxial material) or the slow axis (e.g., corresponding to the optical axis of orientation for a retarder including a positive uniaxial material), or some other axis by which the retarding elements are oriented relative to each other. The compound retarders may additionally exhibit the same or similar behavior with respect to retardance variation versus wavelength and incidence angle.

In some embodiments, the ROC architecture may serve to change a spectral shape of a transformation function that light undergoes during the light's traversal through the first and second compound retarders of the pancake lens block. Further, while the ROC architecture described herein may be designed for visible light, in other embodiments, the transformation function of a pancake lens block may also be designed for radiation of different wavelength ranges (e.g., infrared radiation, ultraviolet radiation, and the like).

In another embodiment, a first compound retarder may be considered as a "black box" (e.g., a device which can be viewed in terms of its inputs and outputs) that may convert linearly polarized light to circularly polarized light in a range (e.g., visible range) of wavelengths. Moreover, a similarly designed second compound retarder having a compound optical axis that is rotated by approximately ninety degrees with respect to the first compound retarder compound optical axis may be used in the pancake lens block to convert the light traversed through the first compound retarder and the second compound retarder back to linearly polarized light having the same orientation as the orientation of the originally incident light on the first compound retarder.

In another embodiment, the first compound retarder may be a contrast determining element that may be sensitive to small optical imperfections. Therefore, the output of the first compound retarder may not be light having circular polarization, but rather, may be light having elliptical polarization, which may lead to compounding optical effects in the pancake lens. In some embodiments, the greater the number of components (e.g., five QWPs, or any odd number of QWPs) in a given compound retarder, the better the compound retarder may transform the linearly polarized light to circularly polarized light for light having normal incidence. For such a multi-layer (e.g., five layer) compound retarder, a second, substantially similar compound retarder in a ROC configuration placed in series with the multi-layer compound retarder may be able to transform the SOP of the originally incident light and thereby restore the original linear polarization of the light. However, when the incident light on the multi-layer compound retarders in the ROC configuration is off-normal, such multi-layer compound retarders may distort the polarization state of the light.

In another embodiment, for an ROC pancake lens block including two compound retarders in series, the two compound retarders may have no net effect on the polarization state of light at the output of the two compound retarders if the interim polarization state (e.g., the polarization state of the light at the output of the first compound retarder and before the input of the second compound retarder) is circularly polarized, assuming normally incident light at the input of the first compound retarder. If the interim polarization state of the light is not circular polarization, the two compound retarders may not fully restore the linear polarization state of the light at the output of the second compound retarder, leading to reduced contrast in the pancake lens block. In some embodiments, a pair of compound retarders in the ROC arrangement may restore the input state-of-polarization of light at normal incidence, at least in part because the composite Jones matrix corresponding to the compound retarders in the ROC arrangement is an identity matrix. Further, the composite Jones matrix may be the identity matrix regardless of the transformation associated with the first compound retarder or the corresponding number of retarders (e.g., number of QWPs), optical axes of orientation of the retarders (e.g., angles of the QWPs), and the retardation values of the retarders (e.g., retardation values of the QWPs) used in the first compound retarder. In some embodiments, a deviation from the ROC relationship between the compound retarders may result in a departure from the identity matrix for the composite Jones matrix associated with the ROC pancake lens block.

In some embodiments, the retardances of the constituent elements (e.g., constituent QWPs) for each of the compound retarders may be equal, and the axes of orientations of the constituent elements (e.g., axes of orientation of the constituent QWPs) of the two compound retarders may be crossed (e.g., made orthogonal to one another) between the two compound retarders. In some embodiments, the polarization state of light may be a circular polarization at the midpoint (e.g., the output of the first compound retarder and the input of the second compound retarder). Further, the polarization state (e.g., linear polarization) of the light incident on the first compound retarder may be restored at the output of the second compound retarder (e.g., the same linear polarization). In another embodiment, a trade-off in the design of the ROC pancake lens architecture may exist in that designs that may accommodate for wide-angles of incidence may require small component counts (e.g., three QWPs in each compound retarder), while designs that are optimized for achromaticity and the generation of circular polarization at the midpoint between compound retarders may favor high component counts (e.g., greater than three QWPs in each compound retarder).

FIG. 1 shows a cross sectional view 100 of an embodiment of pancake lens block 102 in accordance with one embodiment. In another embodiment, pancake lens block 102 may be configured to provide a folded optical path by utilizing polarizing optical components and providing optical power in a compact optical system. Pancake lens block 102, in some embodiments, may be part of a head-mounted display and may include front optical element 104 and back optical element 106 that focuses light from electronic display screen 108 to exit pupil 110 where an eye 112 of a user is positioned when viewing content on electronic display screen 108.

For purposes of illustration, FIG. 1 shows a cross section 100 of pancake lens block 102 associated with a single eye 112, but another pancake lens assembly, separate from pancake lens block 102 shown in FIG. 1, may provide altered image light to another eye of the user. Some embodiments of the pancake lens have different components than those described here. Similarly, in some cases, functions may be distributed among the components in a different manner than is described here.

Light emitted from electronic display 108 may be linearly polarized. In some embodiments, electronic display 108 includes one or more linear polarizers (POL1, to be shown and described in connection with FIG. 2, below) that linearly polarize light emitted from electronic display 108. Alternatively, light emitted from light emitting components (e.g., light-emitting diodes, LEDs) may be emitted as linearly polarized light.

Pancake lens block 102 illustrated in FIG. 1 includes front optical element 104 and back optical element 106. One or more surfaces of front optical element 104 and back optical element 106 may be shaped, for example, to correct for one or more optical aberrations, such as field curvature. For example, one or more surfaces of front optical element 104 may be shaped to be spherically concave (e.g., a portion of a sphere), spherically convex, planar, a rotationally symmetric sphere, a freeform shape, or some other shape that mitigates one or more optical aberrations, such as field curvature. In some embodiments, the shape of one or more surfaces of front optical element 104 and back optical element 106 may be designed to additionally correct for other forms of optical aberration. In some embodiments, one or more of the optical elements within pancake lens block 102 may have one or more coatings, such as anti-reflective coatings, for example, to reduce ghost images and to enhance contrast in the pancake lens block 102.

Back optical element 106 may include a first compound retarder 130 and a mirrored surface 132 (also referred to as partial reflector herein). In this example, first compound retarder 130 may include QWPs (e.g., three QWPs) that transform the polarization of received light. The first compound retarder 130 may have a compound optic axis oriented at approximately 45 degrees relative to incident linearly polarized light (e.g., from the electronic display 108 and/or from a linear polarizer associated with the electronic display 108) such that first compound retarder 130 converts linearly polarized light into circularly polarized light. As noted, the first compound retarder 130 may include multiple retarders, such as QWPs. In another embodiment, QWPs may be made of birefringent materials such as quartz, organic stretched material sheets, or liquid crystal. In one embodiment, the QWPs may be designed to be optimized such that the dependence of the retardance induced by a given retarder remains close to a quarter of a wave independently of the wavelength and the angle of incidence on the QWP.

In some embodiments, the compound retarders (e.g., first compound retarder 130 and second compound retarder 140, to be discussed below) may include three QWPs. The first two QWPs (with respect to the display side) of the compound retarders may collectively act as a half-wave (HW) retarder of light incident on the third QWP of the compound retarders. In some embodiments, such an arrangement may ensure a match between the center wavelength of the HW retarder and the QWP retarder. In some embodiments, a pancake lens configuration whereby the first two QWPs together act as a HW retarder to the third QWP in each compound retarder may be referred to herein as a HW-compensated QWP. Specifically, the chromatic HW retarder may pre-disperse the state of polarization (SOP) of the incident light, and the third QWP (e.g., chromatic QWP) may subsequently transform the light having a range of wavelengths to a common circular SOP. In another embodiment, the HWs (including two QWPs) of the compound retarder may serve to pre-disperse the polarization state of the light, while the third QWP of each compound retarder may further tune the polarization.

In some embodiments, a given, single chromatic QWP may convert linearly polarized light to circularly polarized light at a pre-determined (e.g., designed) quarter wavelength. For example, such a QWP may be configured to convert predominantly green light from linear polarization to circular polarization. However, the same QWP may not be able to effectively convert predominantly red light from linear polarization to circular polarization while also converting the green light (as the pathlength-difference may be insufficient at longer wavelengths). Further, the same QWP may not be able to effectively convert predominantly blue light from linear polarization to circular polarization (as the pathlength difference may be excessive at shorter wavelengths). Accordingly, with a single QWP, the blue light may be overcompensated (e.g., over-retarded) by the QWP, while the red light may be undercompensated (e.g., under-retarded) by the QWP. In some embodiments, by using a chromatic HW retarder before the QWP in a compound retarder, the HW may have a compound optic axis orientation with respect to the third QWP such that the SOPs of blue light and red light are slightly elliptically polarized with the same orientation and opposite handedness (in terms of polarization state) to serve as input for a chromatic transformation of the third QW retarder.

In some embodiments, the SOP of green light (or a wavelength substantially intermediate between the blue and red wavelengths) may be substantially linear after the HW retarder. The three-layer configuration may transform light at two wavelengths (e.g., blue and red) to a circular SOP, versus a single QWP, which may optimally transform light of a single wavelength. In some embodiments, the optical axes of the compound retarder (e.g., the angles of the QWPs) may determine the wavelength separation between these two wavelengths, and therefore the extent of deviation from circular polarization at intermediate wavelengths between the two wavelengths. Therefore, the compound retarder may be used to convert broadband linearly polarized light (e.g., visible light including red, green, and blue light) to circular polarization, and thus serve as an achromatic compound retarder. In some embodiments, the HW (including two separate QWPs) may have double the magnitude of retardance of the third QWP in each compound retarder.

In another embodiment, mirrored surface 132 (also referred to herein as a partial reflector) may be partially reflective to reflect a portion of the received light. In some embodiments, mirrored surface 132 may be configured to transmit approximately 50% of incident light and reflect approximately 50% of incident light. In some instances this relationship may be substantially preserved over the visible spectrum.

Front optical element 104 may include a second compound retarder 140 and a reflective polarizer 142. The second compound retarder 140 may also include individual retarders such as QWPs (e.g., three QWPs). The reflective polarizer 142 may represent a polarization-sensitive, partially reflective mirror configured to reflect received light of a first linear polarization and transmit received light of a second linear polarization. For example, reflective polarizer 142 may be a wire grid polarizer configured to reflect linearly polarized light with a polarization direction in the x-direction, and pass light that is linearly polarized in the y-direction. The reflective polarizer 142 may further include a stretched multi-layer extruded polymer stack, such as the 3M reflective polarizer product.

Although shown as surfaces of front optical element 104 and back optical element 106 respectively, first compound retarder 130 and second compound retarder 140 may be separate from front optical element 104 and back optical element 106 in some embodiments. For example, first compound retarder 130 may be located between mirrored surface 132 and electronic display 108 (e.g., as a freestanding element in air, laminated on the surface of electronic display 108, etc.) and second compound retarder 140 may also be similarly located anywhere between mirrored surface 132 and reflective polarizer 142. Further, although shown as curved, the individual optical elements that together compose front optical element 104 and back optical element 106 in FIG. 1 may be flat or be a mix of flat and curved elements when separately provided. For example, as separate elements, first compound retarder 130 and second compound retarder 140 could be provided flat while mirrored surface 132 and reflective polarizer 142 are curved, among other variations. In one embodiment, first compound retarder 130 and second compound retarder 140 may have a cylindrical shape.

In some embodiments, the pancake lens block 102 may serve to mitigate optical aberration in an optical system. Field curvature may refer to an optical aberration that causes a flat object to appear sharp only in certain parts of the frame, instead of being uniformly sharp across the frame. More generally, field curvature may result from a focal distance of an optical system not perfectly aligning with all of the points on a focal plane. Pupil swim may refer to an effect caused by changes in the location of a user's eye within an eyebox that result in distortions in the content being presented to the user. Correcting for field curvature may mitigate pupil swim. In some embodiments, the pancake lens may mitigate field curvature in an image that is output to a user's eyes to reduce pupil swim. Additionally, pancake lens block 102 may have a small form factor, may be relatively low weight compared to other optical systems designed to remove field curvature, and/or may be configured to have a wide field of view. The operation of pancake lens block 102 is discussed below with respect to FIG. 2.

Figure 2:
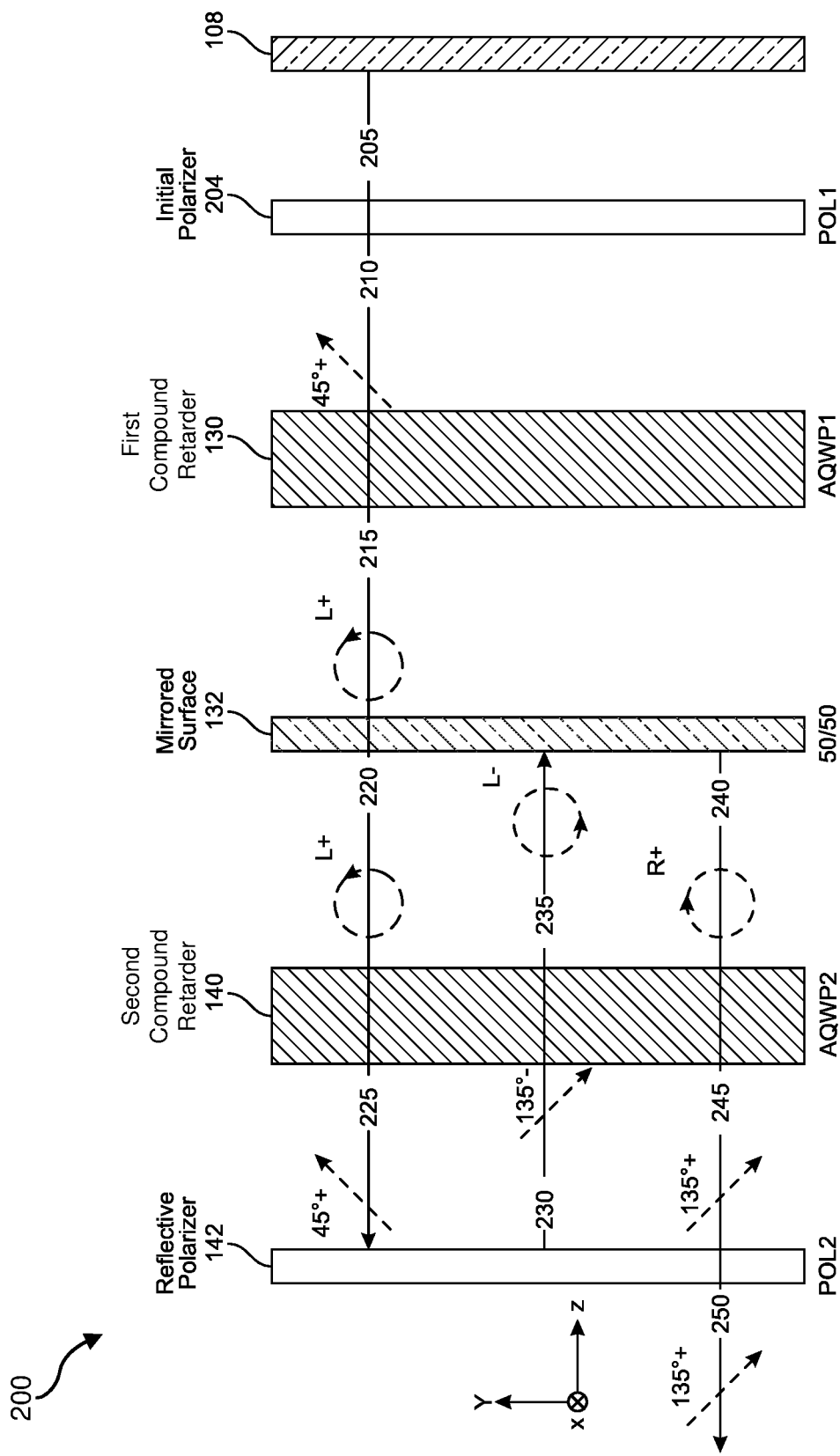
FIG. 2 shows a folded optical path with example polarization states of a pancake lens block, in accordance with one embodiment.

FIG. 2 shows a folded optical path of pancake lens block 102 in accordance with one embodiment. Light 205 from electronic display screen 108 may be initially polarized via initial polarizer 204 (POL1) to linearly polarized light 210. In some embodiments, the light emitted by the display may be already linearly polarized, in which case POL1 may not be needed. First compound retarder 130 may include an achromatic QWP (AQWP1) (e.g., including three QWPs, where the first two QWPs together serve as a HW to the third QWP, as described above) with a compound optical axis that is approximately 45 degrees relative to the direction of polarization of polarized light 210. The orientation of a compound retarder's optical axis relative to incident linearly polarized light may control the handedness and polarization ellipticity of the transmitted circularly polarized light. AQWP1 may change the polarization of light 210 from linear polarization to circular polarization for a given center wavelength and a given angle (e.g., normal incidence), which is shown as light 215. The polarization of light 215 may be clockwise or anti-clockwise based on the orientation of the axis of AQWP1 relative to incident linearly polarized light 210.

A first portion of light 215 may be reflected by mirrored surface 132 (also referred to as a partial reflector herein), and a second portion of light 215 may be transmitted by mirrored surface 132 as light 220 towards second compound retarder 140. In some embodiments, mirrored surface 132 may be configured to reflect approximately 50% of incident light (e.g., the light 215). Second compound retarder 140 may include an achromatic QWP (AQWP2) (e.g., also including three QWPs, where the first two QWPs together serve as a HW to the third QWP, as described above) and may change the polarization of light 220 from circular to linear (with light passing through AQWP2 referred to as light 225). In this arrangement, light first encounters a QW, then the HW per the "reverse order" architecture to restore the SOP. Light 225 may be incident on reflective polarizer 142 (POL2), which reflects light that is polarized in a blocking/reflecting direction (e.g., an x direction) and transmits light that is polarized in a perpendicular direction (e.g., a y direction). At this point, light 225 may be linearly polarized in the blocking direction. Thus, POL2 may reflect incident light 225 and the reflected light may be referred to as light 230. Accordingly, light 230 is again incident on AQWP2, which changes the linearly polarized light 230 to circularly polarized light 235. Further, mirrored surface 132 may reflect a portion of the polarized light 235, as described above. The reflected portion of light 235 may be referred to as light 240.

Light 240 may also be circularly polarized; however, the handedness of light 240 may be opposite to the handedness of light 235 and light 220 due to the reflection from mirrored surface 132. Thus, AQWP2 may change the polarization of circularly polarized light 240 to linearly polarized light 245. However, as the handedness of light 240 may be opposite to that of light 220, the polarization of light 245 exiting AQWP2 may be perpendicular to that of light 225. Accordingly, light 245 may be linearly polarized in a direction (e.g., y) perpendicular to the blocking direction (e.g., x) of POL2 and may therefore be transmitted by POL2 as light 250.

The process described above, however, may undergo various transformations resulting from imperfections in one or more optical elements. There may, for example, be other light paths in pancake lens block 102 due to imperfections in pancake lens block 102, and these imperfections may cause light leakage, ghost images, and the like. In particular, the wavelength of light may vary (e.g., over the visible spectrum), and a retardance of single QWPs may be a function of wavelength (and may vary with wavelength). Accordingly, a conventional (non-achromatic) QWP (e.g., not the compound retarders disclosed herein) may not be able to provide a quarter-wave retardance over the range of wavelengths of light falling incident thereon.

For example, if AQWP1 were not achromatic (e.g., referred to as QWP1), and were to produce elliptically polarized light instead of circularly polarized light, QWP2 (a non-achromatic version of AQWP2) would transmit elliptically polarized light instead of linearly polarized light. Accordingly, if the SOP of the elliptically polarized light is not restored to the input linear state, at least some light 225 may leak through POL2 in the first see-through path (and lead to artifacts called see-through ghosts) rather than reflect from POL2, as described above. Any leakage of light may be a problem, for example, when using a broadband light source, such as a color display with common chromatic QWPs (e.g., a quarter-wave plate providing quarter-wave retardance for light propagating in a specific direction at a specific wavelength). When light with a wavelength outside of the designed wavelength (and/or outside of the designed incident angle) propagates through a chromatic QWP, the polarization of the output light may be altered from the designed polarization state(s) shown in FIG. 2. Accordingly, the restoration of the input polarization of linear light may be accomplished with any combination of retarder stacks that restores the input SOP (i.e., ROC), so in such an architecture, there may not be a polarization requirement at the mid-point of the optical system.

Figure 3A:
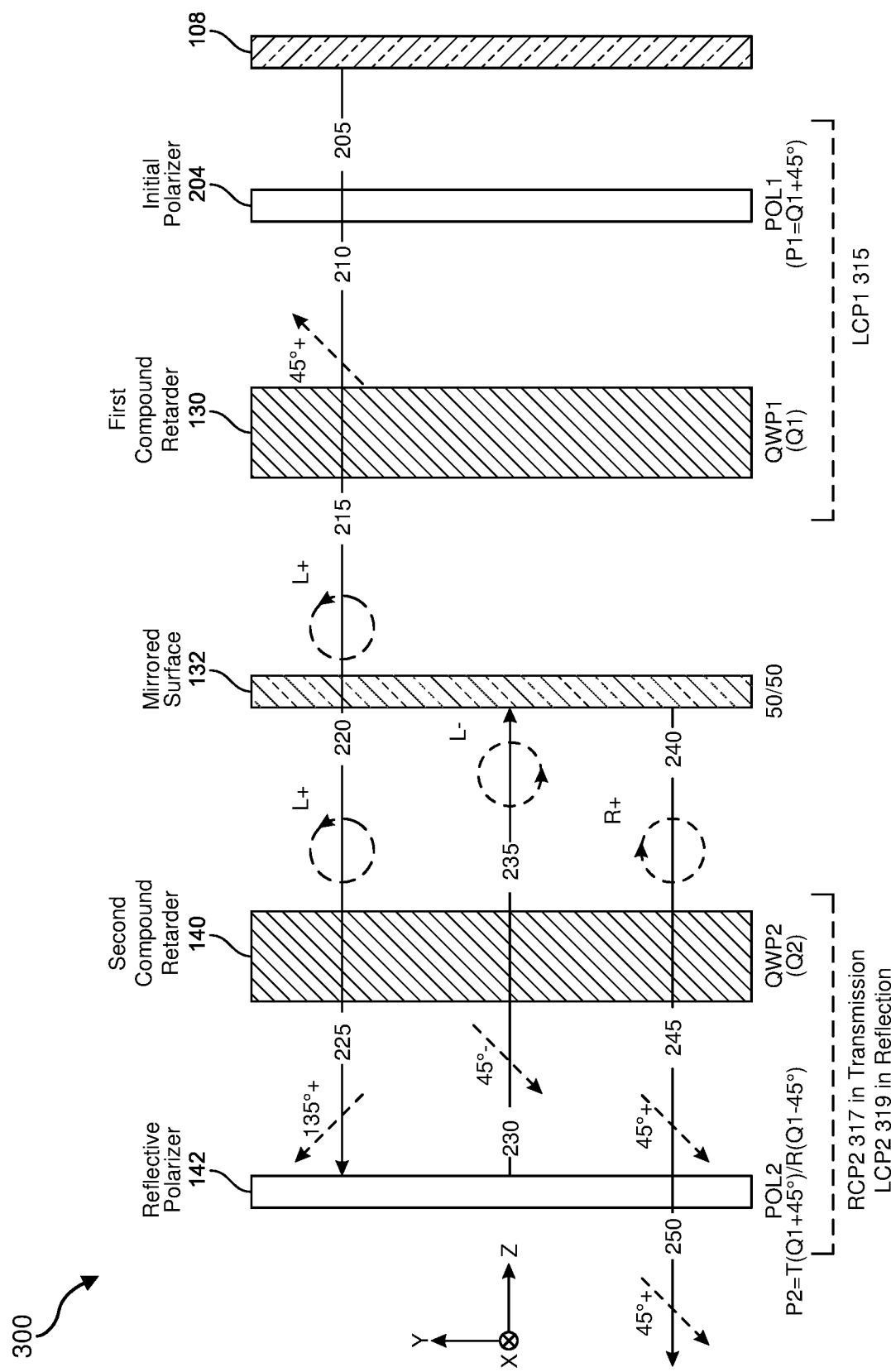
FIG. 3A shows an exemplary pancake lens block with polarizing elements that have no orientation specification between the display polarizing components and the pancake lens block polarizing components, in accordance with one embodiment.

FIG. 3A shows a pancake lens block with polarizing elements that have no orientation specification between the display polarizing components and the pancake lens block polarizing components, in accordance with one embodiment. In particular, FIG. 3A shows a pancake lens block 300 where no specific requirement has been imposed on the relative orientation between the optical element combination including a QWP2 (including a single QWP, which is not achromatic, and part of the second compound retarder 140) and a POL2 (part of reflective polarizer 142), and the optical element combination including a QWP1 (including a single QWP, which is not achromatic, and part of first compound retarder 130) and a POL1 (part of initial polarizer 204). Accordingly, POL1 and QWP1 together effectively operate as a left circular polarizer (LCP1) 315 passing left circularly polarized light. Further, QWP2 and POL2 together effectively operate as a right circular polarizer (RCP2) 317 passing right circularly polarized light in transmission and as a left circular polarizer (LCP2) 319 passing left circularly polarized light in reflection. Accordingly, the polarized light between QWP1 and QWP2 may be circularly polarized. The configuration 300 shown in FIG. 3A may work for any value of Q2, as long as P1 is ±45 degrees relative to Q1 and P2 is ±45 degrees relative to Q2, where P1, P2, Q1, and Q2 denote the optical axis values of POL1, POL2, QWP1, and QWP2, respectively. Here, QWP1 may produce circularly polarized light for a specific wavelength at a specific incidence angle.

FIG. 3B shows an exemplary pancake lens block configuration 301 (aligned to produce the most polarization leakage with wavelength and ray angle) that blocks light during a first see-through path at the designed wavelength (so both compound retarders act as quarter-waveplates), in accordance with one embodiment. As noted, QWP1 may produce circularly polarized light for a specific wavelength at a specific incidence angle. In general, as shown FIG. 3B, this circularly polarized light may be blocked 143 by QWP2 and POL2 optical element combination, regardless of the orientation of Q2, as long as Q2 is orientated 45 degrees relative to P2.

FIG. 3C shows an exemplary pancake lens block configuration 303 (aligned to produce the most polarization leakage with wavelength and ray angle) that leaks light during a first see-through path for light of non-designated wavelengths (so both compound retarders do not act as quarter-waveplates), in accordance with one embodiment. Accordingly, as illustrated in FIG. 3C, since the QWP1 and QWP2 do not provide a quarter-wave retardance for other wavelengths and/or other incidence angles, light with a different wavelength and/or a different incidence angle may leak through 144. For example, as shown in FIG. 3C, QWP2 may transmit elliptically polarized light instead of linearly polarized light, a portion of which may be leaked by 142.

Accordingly, one way to reduce leakage is by fixing the relative orientation between the compound optical axis values Q1 and Q2. Rather than aligning QWP1 with QWP2, which effectively results in a half-wave plate that rotates 45 degrees linearly polarized incident light to 135 degrees linearly polarized light, as shown in FIG. 3A, QWP2 may have an optical axis that is oriented orthogonal to QWP1, as shown in FIG. 4.

Figure 4:
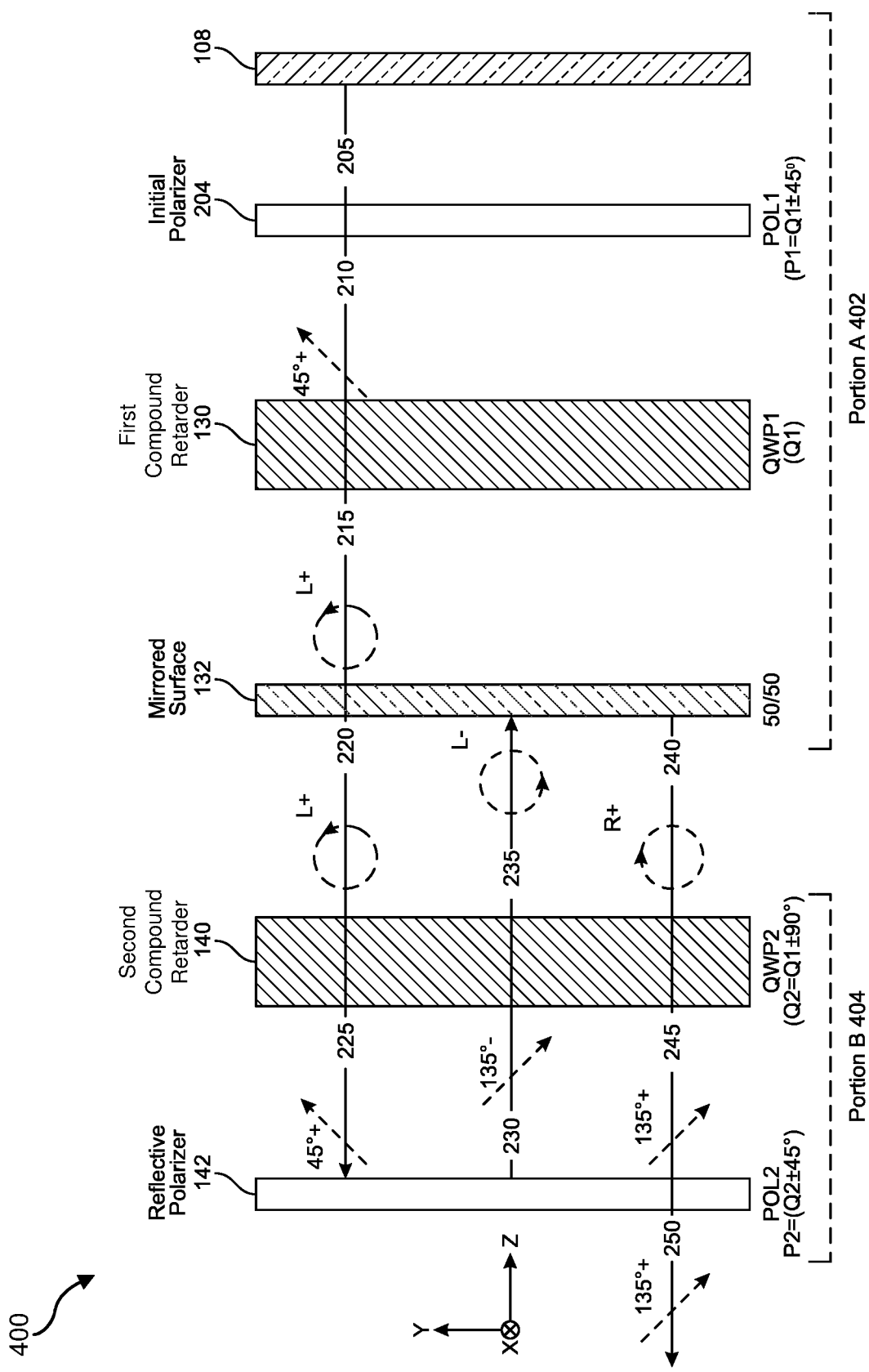
FIG. 4 shows an exemplary pancake lens block with polarizing elements that have an orthogonal orientation relative to each other, in accordance with one embodiment.

FIG. 4 shows an exemplary pancake lens block with polarizing elements that have an orthogonal orientation relative to each other, in accordance with one embodiment. In particular, diagram 400 shows a portion A 402 of the pancake lens block including POL1, QWP1, and mirrored surface 132 (which may be a partial reflector). Further, diagram 400 shows a portion B 404 of the pancake lens block including QWP2 and POL2. In this configuration, QWP2 of portion B 404 may undo the retardance induced by QWP1 of portion A 402 and, thereby, return the 45 degrees linearly polarized incident light on QWP1 back to 45 degrees linearly polarized light for a broadband spectrum of wavelengths. This fixed linearly polarized light at 45 degrees may then be reflected by POL2, and the light leakage may be substantially reduced for a broad spectrum of wavelengths. More precisely, LCP1 315 and RCP2 317 (shown and described in connection with FIG. 3A, above) may be "crossed" (e.g., have optical axes values that are different by 90 degrees, that is orthogonal to one another) in transmission for a broad range of wavelengths (e.g., wavelengths spanning the visible range).

A further explanation for the crossed configuration of the LCP1 315 and RCP2 317 (shown and described in connection with FIG. 3A, above) may be described with reference to FIG. 5 and FIG. 6. In particular, a given compound retarder (i.e., QWP1 or QWP, shown and described in connection with FIG. 3A) may be represented by a vector including two optical properties: a retardance magnitude (e.g., a quarter-wavelength, in this example) and an optical axis orientation (e.g., angle).

Figure 5:
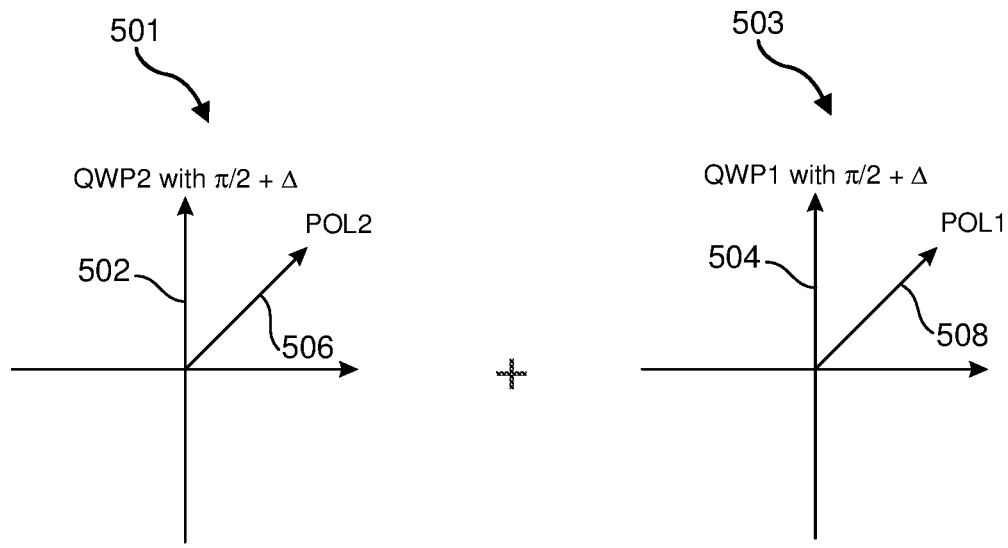
FIG. 5 shows the polarization orientation of an exemplary pancake lens block with polarizing elements that have an orientation specification that produces polarization leakage with wavelength and ray angle, in accordance with one embodiment.

FIG. 5 shows the polarization orientation of a pancake lens block with polarizing elements that have an orientation specification that produces the most polarization leakage with wavelength and ray angle, in accordance with one embodiment. As shown in FIG. 5, if the optical axis 502 of QWP2 as represented by diagram 501 is parallel to the optical axis 504 of QWP1 as represented by diagram 503, the retardance of the QWPs may be effectively additive (e.g., the polarization vector 506 for QWP2 and the polarization vector 508 for QWP1 are additive), and a spectral dispersion effect on light propagating through the QWPs increases. The light leakage of such imperfect QWPs in pancake lens block 102 may thus be proportional to $\cos^2(\pi/2+\Delta)$, where $\pi/2$ is included to capture the retardance magnitude of the quarter-wave and $\Delta$ is a retardance error of QWP1 and QWP2. For example, a 15 degrees retardance error for $\Delta$ may result in a light leakage of approximately 6.7% through the pancake lens block 102 (see FIG. 1), for example, which may degrade image contrast and lead to the formation of ghost images in optical systems using the pancake lens block.

Figure 6:
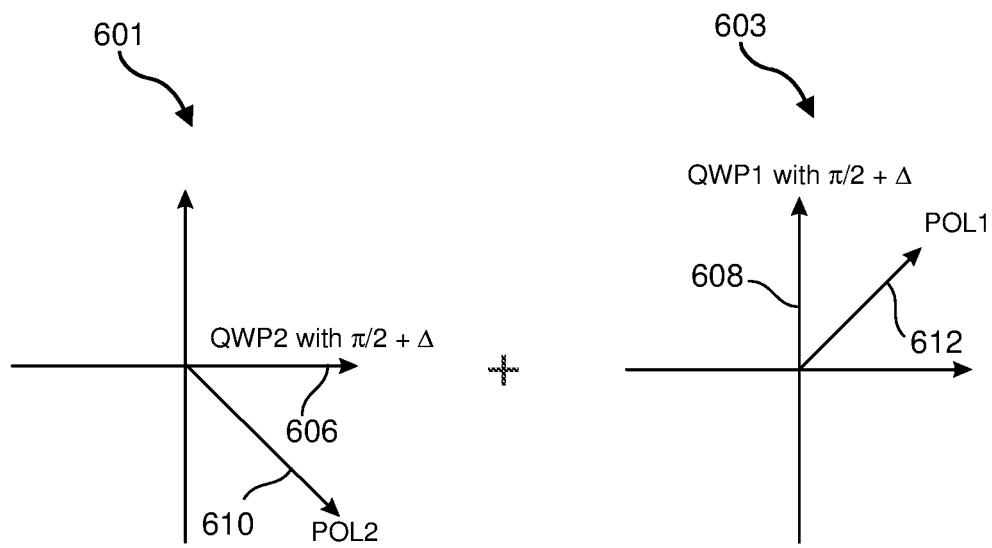
FIG. 6 shows the polarization orientation of an exemplary pancake lens block with polarizing elements that have an orthogonal orientation relative to each other that produces the polarization leakage with wavelength and ray angle, in accordance with one embodiment.

FIG. 6 shows the polarization orientation of a pancake lens block with polarizing elements that have an orthogonal orientation relative to each other that produces the least polarization leakage with wavelength and ray angle, in accordance with one embodiment. Referring to FIG. 6, if the optical axis 606 for QWP2 as represented by diagram 601 is set orthogonal to the optical axis 608 of QWP1 as represented by diagram 603, the vectors representing the magnitudes of the retardance and the optical axes of the compound retarders may subtract (e.g., the polarization vector 610 for QWP2 and the polarization vector 612 for QWP1 are subtractive), and a spectral dispersion effect on light propagating through the QWPs may decrease. The subtraction of the vectors may effectively cancel the retardance error $\Delta$ of both QWP1 and QWP2. Thus, the optical aberrations of the combined QWPs in this arrangement may effectively be zeroed out. Accordingly, the transmitted linearly polarized light from QWP2 (e.g., light 250 shown in connection with FIG. 3A and described in connection with FIG. 2) may be the same as the linearly polarized light incident on QWP1 (e.g., light 210 shown in connection with FIG. 3A and described in connection with FIG. 2). Moreover, since the transmission axis of POL2 is orthogonal to POL1, the transmitted linearly polarized light from QWP2 may not transmit through POL2.

As described above, a pancake lens block may serve to fold incident light to increase the optical path length and generate a corresponding optical effect (e.g., increased contrast, reduced weight, and the like) of the optical system. In at least one embodiment, the pancake lens block may use any of the polarization management techniques described herein including, but not limited to, the use of compound retarders (e.g., compound retarders including QWPs) that are in a reverse order crossed relationship to one another. In some embodiments, the folding of the incident light may be induced by using an optical cavity (e.g., an optical cavity between a partial reflector and a reflective polarizer of the pancake lens block), where the polarization state of the light is managed. Further, it may be desirable to have one or more optical components (e.g., lenses), inside the optical cavity, for example, to increase the optical power of the pancake lens. The one or more optical components (e.g., quarter wave plates, partial reflectors, reflective polarizers, and the like) may include a plastic material.

Plastic optical components may be both light and cheap, as compared, for example, with glass optical components. Accordingly, many optical components may be made from plastics. However, plastics used in the fabrication of optical components may have high stress optical coefficients (e.g., a parameter used to calculate stress birefringence that depends on the material type, wavelength, temperature, and other factors). When stress is applied to optical components made from plastic (e.g., during a manufacturing and formation processes such as injection molding), the stress may lead to the plastic components having birefringence (e.g., where the refractive index of the plastic components may then depend on a polarization direction and propagation direction of light).

In some aspects, the birefringence of the plastic components may have a pattern resulting from applied stress during the formation and manufacturing process. In particular, the plastic components may be imparted with stress from a differential cooling process, which results in non-uniform rates of cooling of the formed plastic components during manufacturing. Further, in such differential cooling processes, a more uniform cooling may occur at locations where a given plastic component is thicker as compared with locations where the plastic component is thinner. This may result in extra stress in regions of the plastic components where there the plastic component is thinner as compared with regions in which the plastic component is thicker.

In some aspects, an azimuthal compensator that includes a spatially patterned optical retardation film may be used to couple with a plastic-based optical component (e.g., an injection molded optical component) and thereby compensate for stress-induced birefringence in the plastic-based optical components. Accordingly, such an azimuthal compensator may reduce the sensitivity of a given plastic-based optical component to the angle of incident light. In at least one embodiment, the azimuthal compensator may include a spatially patterned retardation film that may compensate for excess circumferential (e.g., azimuthal) retardance in the plastic-based optical elements.

Figure 7:
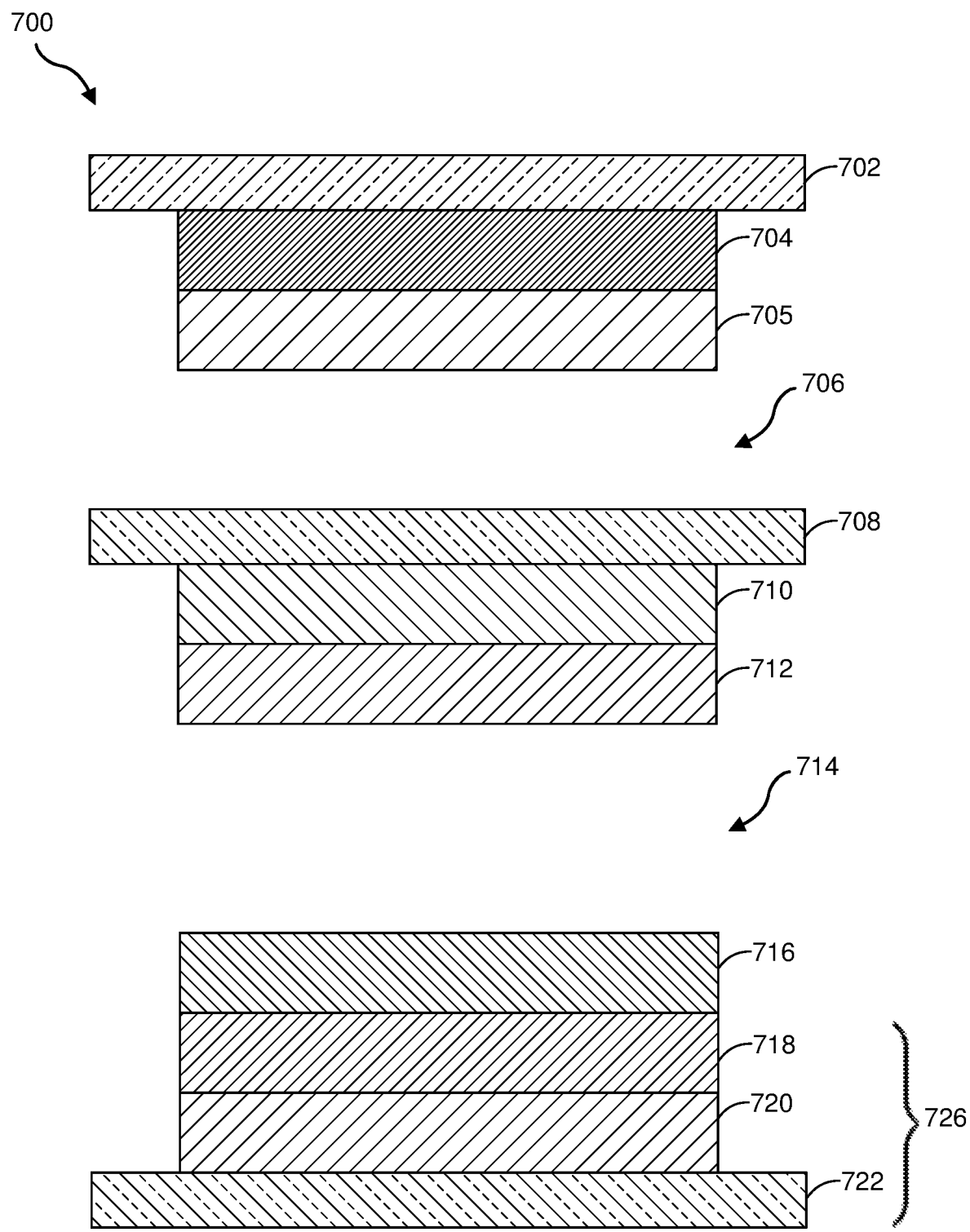
FIG. 7 shows a diagram of an example pancake lens block using an azimuthal compensator, in accordance with example embodiments of the disclosure.

FIG. 7 shows a diagram of an example pancake lens block that includes an azimuthal compensator, in accordance with example embodiments of the disclosure. As shown in FIG. 7, an azimuthal compensator 710 may be used in connection with an ROC-based pancake lens block. In particular, diagram 700 depicts a pancake lens block that may include one or more compound retarders (e.g., a first compound retarder 705 and a second compound retarder 712, each including one or more individual retarders, such as QWPs), a partial reflector 708, an azimuthal compensator 710, and a reflective polarizer 716. Moreover, the diagram 700 shows a polarizer 704, such as a linear polarizer that may be coupled to a display 702, such as an LCD, LED, or OLED display). Additionally, diagram 700 illustrates that the pancake lens block may optionally include a second polarizer 718, a third compound retarder 720, and an antireflective lens or material 722 that may together form an eye-reflection reduction portion 726, which may serve to reduce the effect of reflections from the eye of a user back into the visual field of the user. In at least one embodiment, a distance (e.g., a first distance 706 or a second distance 714) defining a gap (e.g., an airgap or a gap filled with a material such as a nanovoided material, to be described below) may be introduced between optical components. For example, a first distance 706 may be introduced between the first compound retarder 705 and the partial reflector 708 or a second distance 714 between the second compound retarder 712 and the reflective polarizer 716 in an ROC pancake lens block to extend the light's folded path length in the ROC pancake lens block without adding significant additional weight to the ROC pancake lens block.

As noted, the distance defining a gap (e.g., a gap associated with the first distance 706 or second distance 714) may include air or any other suitable material, such as a nanovoided material (e.g., a material having a plurality of voids and/or nano-sized voids in the material having a predetermined density of nanovoids that include an associated refractive index that may be tuned. In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may be between approximately 10 nm and approximately 1000 nm, such as between approximately 10 and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

In some embodiments, the nanovoided material may be formed from curable materials (to be described below), and a first side of the nanovoided material may be deposited onto a removable substrate material. Moreover, a second, exposed side of the nanovoided material may be laminated onto a surface of a given optical element in the ROC pancake lens (e.g., a surface of the second compound retarder 712 or a surface of the reflective polarizer 716), and the removable substrate material may be removed from the first side of the nanovoided material.

Further, in terms of fabrication of the nanovoided material, a curable material (e.g., a monomer) may be deposited (e.g., vaporized by a vaporizer as part of a deposition system, such as a thermal evaporation system) onto a removable substrate material. In some embodiments, a corresponding monomer initiator may be used for starting a chemical reaction to form the nanovoided material. In some examples, "monomer," as used herein, may refer to a monomer that forms the nanovoided material.

Moreover, the deposited curable material may be cured with a source of radiation (e.g., actinic energy) to form the polymer material. In some embodiments, the source of radiation may, for example, include an energized array of filaments that may generate actinic energy to initiate reaction between the monomer and the monomer initiator to effect polymerization of the monomer. The monomer and monomer initiator may react upon exposure to radiation from a radiation source to form a polymer element. In some examples, "actinic energy," as used herein, may refer to energy capable of breaking covalent bonds in a material. Examples may include electrons, electron beams, x-rays, gamma rays, ultraviolet and visible light at appropriately high energy levels, and ions.

In various embodiments, a birefringence pattern imparted to one or more plastic components (e.g., first compound retarder 705, second compound retarder 712, partial reflector 708, and the like) during formation may be characterized as follows. As will be further shown and described in connection with FIG. 8 below, assuming that the plastic components are cylindrical, the plastic components may, after fabrication, include a slow-axis that is circumferential such that the difference in retardance between the slow-axis and a fast-axis of a given plastic component tends to increase from a thicker portion of the plastic component (e.g., in the middle of the plastic component) to a thinner portion of the plastic component (e.g., at an edge of the plastic component). Accordingly, in some embodiments, an offsetting compensator may be manufactured and designed to serve as a matched pair to the plastic component having the differential retardance. Such an offsetting compensator may be referred to as an azimuthal compensator herein, and the azimuthal compensator may provide retardance compensation for the plastic component, the retardance compensation being radial in direction. In at least one embodiment, the azimuthal compensator may have a maximum thickness that is approximately equal to a thickness of the plastic lens. In another aspect, the thickness of an azimuthal compensator may be from approximately 0.2 to approximately 10 microns (e.g., from approximately 0.3 to approximately 5 microns or from approximately 0.5 to approximately 3 microns).

In some embodiments, designing an azimuthal compensator (e.g., azimuthal compensator 710 shown in FIG. 7) that is fabricated as a matched pair specifically for every lens may be impractical. Yet, for plastic components formed using high stress optical coefficient materials, the distribution of the patterns of the lenses may be repeatable and predictable (within a given tolerance). Moreover, low stress optical coefficient materials may be more expensive and difficult to obtain, so plastic optical components may be made from high stress optical coefficient materials. Such materials having high stress optical coefficients may have a low contrast (e.g., a 3:1 contrast), which may be enhanced (e.g., to 10:1 or even 100:1 contrast) using the azimuthal compensator in combination with the plastic optical components. In some aspects, the compensatory effect may be strong enough (e.g., the strength of the radial retardance may be high enough at the edge of the lens), that even though the azimuthal compensator may not be an ideally complementary matching azimuthal compensator for the plastic optical component, the average azimuthal compensator may still be helpful in improving the optical performance (e.g., contrast) of many plastic optical components.

In some aspects, the retardation of a retarder can be modulated by, for example, spatial patterning of retarder thickness. In at least one embodiment, the retardation of a retarder can be modulated by spatial patterning of the pre-tilt of a uniform thickness retarder, such that the projection of a compensator's optical axis varies locally with respect to incident light. Spatial patterning of in-plane optical-axis orientation can be produced by a spatial patterning of an orientation or by using an alignment layer. Alignment layers may typically be thin polymer (e.g. polyimide) layers that determine the orientation of liquid crystal (LC) alignment. In some instances these layers may be physically rubbed along an axis prior to coating the LC film. Alternatively, photo-polymers can determine an orientation by exposure to polarized UV light, where the orientation of polarization can subsequently determine the LC optical axis orientation (both in-plane orientation and pretilt). Spatial patterning of UV light can be done in a sequential mode using a scanned laser, or simultaneously using a mask.

Alternatives to the azimuthal compensator 710 may be heavier (e.g., glass lenses), more-expensive, and/or difficult to obtain (e.g., low stress optic coefficient plastic components) and/or have lower optical power (e.g., in the case of more complex complementary geometries and materials). In some aspects, the azimuthal compensator 710 may serve to reduce the weight of the optical system by enabling plastic components (e.g., injection molded lenses) to be used in applications requiring higher precision and optical accuracy than those achievable using plastic components without compensation (e.g., plastic components having stress birefringence). In at least one embodiment, the azimuthal compensator 710 may improve the contrast of optical systems by enabling plastic components made with higher stress optical coefficients to be used.

In some aspects, although the embodiments described herein in connection with azimuthal compensators may include two compound retarders in an ROC configuration where each compound retarder includes multiple (e.g., an odd number of) retarders such as QWPs, alternative embodiments may include designs having two single-element retarders (e.g., two single QWPs) in series in an ROC configuration.

In some aspects, the azimuthal compensator 710 may be fabricated using a spin coating process (e.g., a non-uniform spin coating process), to be described in greater detail below. Alternatively or additionally, the azimuthal compensator 710 may be fabricated using a reactive mesogen that is configured to generate a film having a differential thickness (e.g., a thickness that varies in the radial direction), also to be described in greater detail below. In at least one embodiment, the azimuthal compensator 710 may be fabricated using a reactive mesogen that is cured such that the pre-tilt of mesogen changes in the radial direction. In particular, the retardance of mesogen may be related to the pretilt such that a change in the pretilt may change the retardance; accordingly, the azimuthal compensator's retardance may be changed with radius of the azimuthal compensator 710.

In a birefringent material, a wave of light may propagate with two polarization components which generally are governed by different effective refractive indices. In some embodiments, a uniaxially birefringent material may include a slow axis corresponding to a direction where the material has a higher effective refractive index (e.g., called an extraordinary index $n_e$), resulting in a slower phase velocity of propagating light. Moreover, the birefringent material may include a fast axis corresponding to a direction where the material has a lower effective refractive index (e.g., called an ordinary index $n_o$). When light is incident on such a uniaxially birefringent material from another material (e.g., a plastic optical component material) with a lower refractive index, the incident light may split into a slow component propagating along the slow axis of the birefringent material and a fast component propagating along the fast axis of the birefringent material. Moreover, a ray of the slow component may be refracted more towards the normal (e.g., the optical axis of the system) than a ray of the fast component. In at least one embodiment, a uniaxially birefringent material may be classified as positive when the extraordinary index of refraction $n_e$ is greater than the ordinary index $n_o$. In other words, the polarization of the fast (or slow) portion of the incident light may be perpendicular to the optical axis when the birefringence of the crystal is positive (or negative, respectively).

Figure 8:
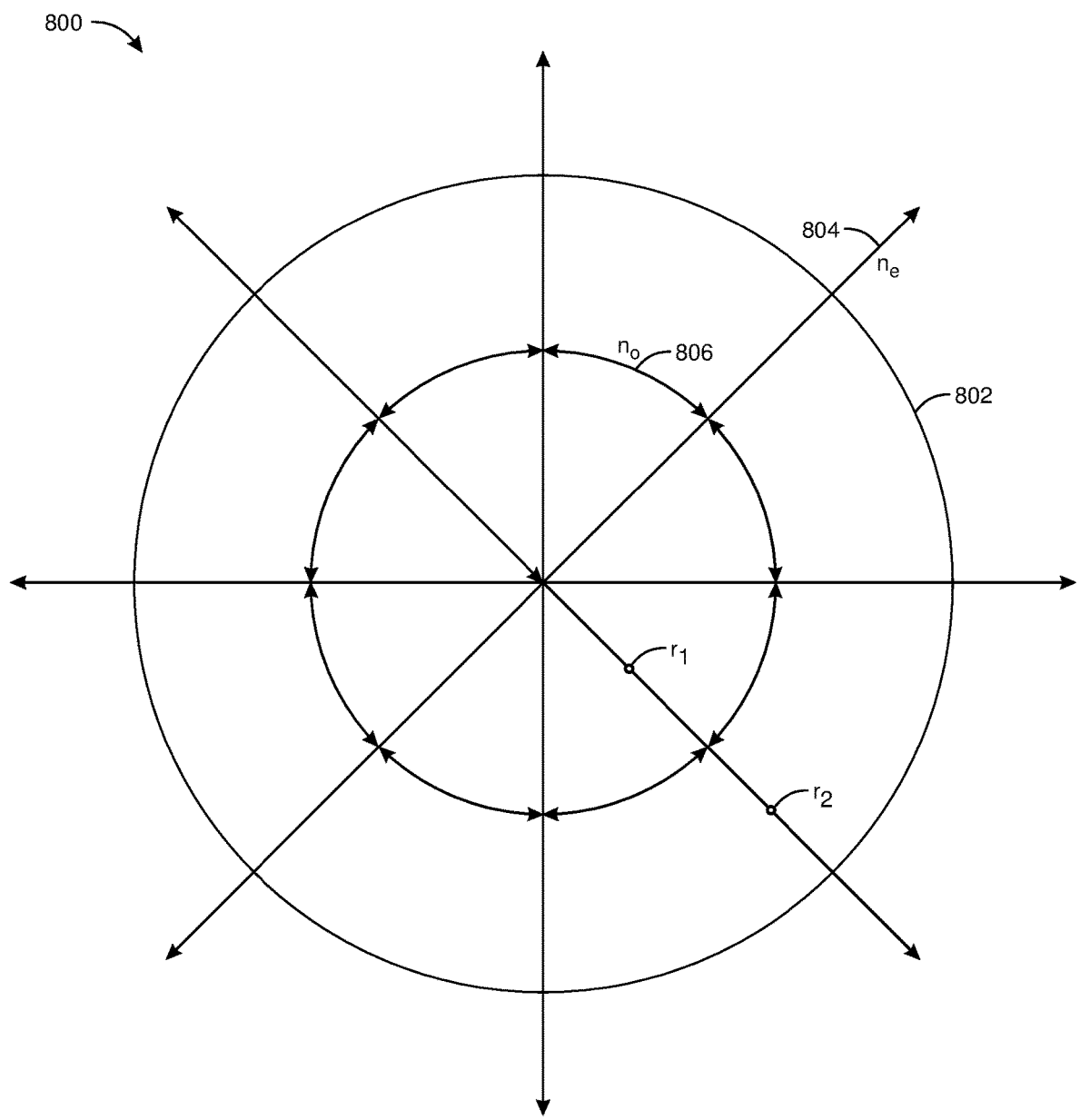
FIG. 8 shows an example diagram illustrating birefringence (e.g., stress induced birefringence) in an azimuthal compensator, in accordance with example embodiments of the disclosure.

FIG. 8 shows an example diagram illustrating birefringence (e.g., stress induced birefringence) in azimuthal compensators, in accordance with example embodiments of the disclosure. An optical element (e.g., a compound retarder, a partial reflector, a reflective polarizer, or the like) may include a plastic component. Further, the plastic component may include a slow-axis that is circumferential such that the difference in retardance between the slow-axis and a fast-axis of the plastic component tends to increase from a thicker portion of the lens (e.g., in the middle of the lens) to a thinner portion of the lens (e.g., at an edge of the lens). Accordingly, in some embodiments, an offsetting compensator 800 (also referred to as a variable compensator or azimuthal compensator herein) may be manufactured and designed to form a matched pair to the plastic component having the differential retardance between the slow-axis and fast-axis of the plastic component.

In particular, the azimuthal compensator 800 may include a slow axis 802, that may be circumferential (i.e., azimuthal). Moreover, the azimuthal compensator 800 may include a slow axis 804 that may be radial. Accordingly, the azimuthal compensator 800 may slow down the light propagating via the radial axis to match the speed of the light propagating via the circumferential axis of the plastic component. In other words, the slow axis 804 of the azimuthal compensator 800 may be radial in direction and may increase with the increasing radius of the azimuthal compensator 800. Thus, the azimuthal compensator 800 may have a fast axis 806 that may be oriented in a direction perpendicular to a radius of the azimuthal compensator 800 and a slow axis 804 that may be parallel to the radius of the azimuthal compensator 800. Further, an amount of retardation provided by the azimuthal compensator 800 may increase with an increasing radius of the azimuthal compensator 800.

Figure 9:
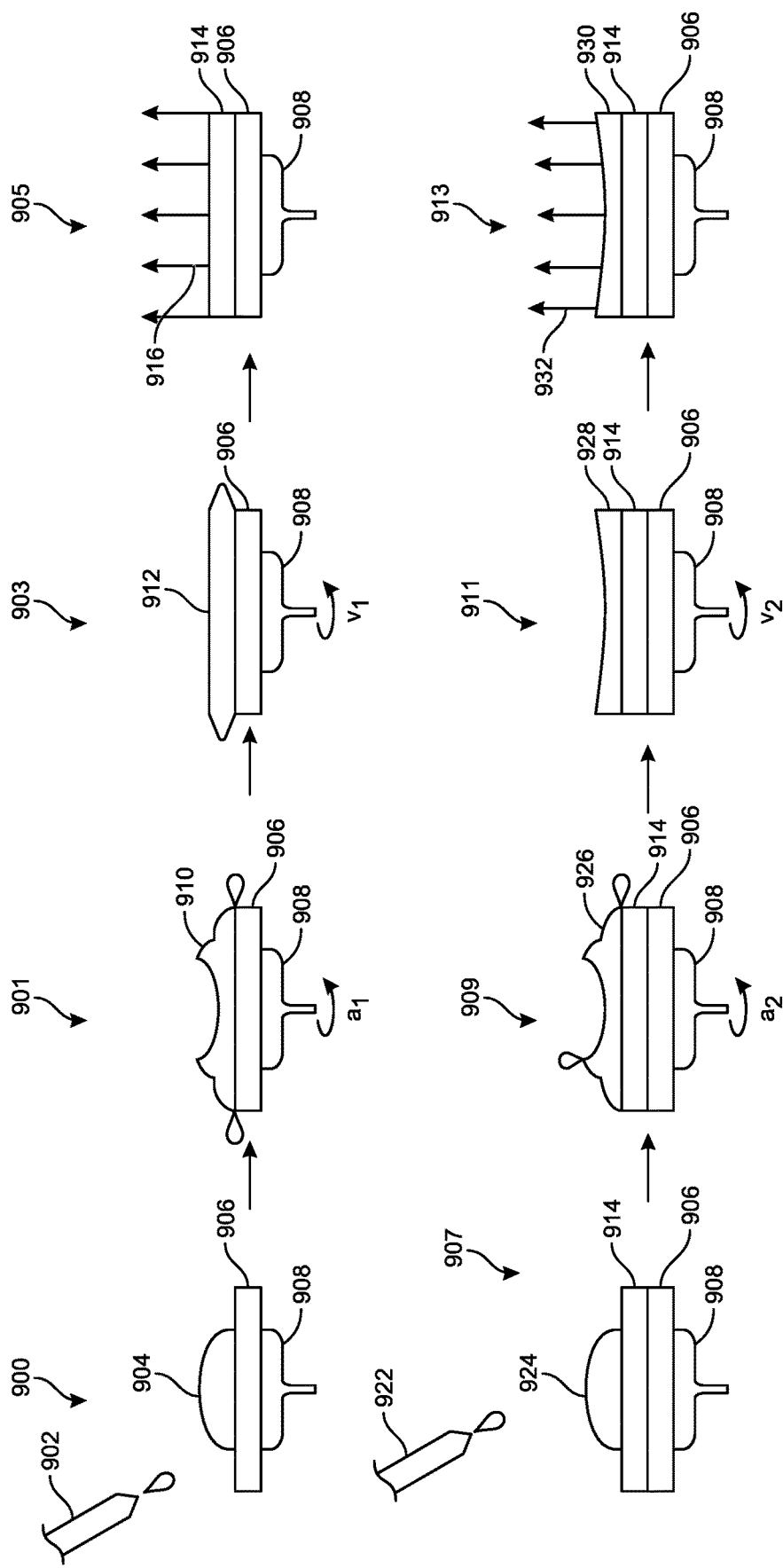
FIG. 9 shows diagrams of an example formation process for an azimuthal compensator, in accordance with example embodiments of the disclosure.

FIG. 9 shows diagrams illustrating an example formation process of an azimuthal compensator, in accordance with example embodiments of the disclosure. In particular, diagram 900 of FIG. 9 shows a substrate 906 having a rotational axis through the center of the substrate 906 and perpendicular to its surface. In some embodiments, the substrate 906 may be rotated about its rotational axis at an angular velocity (e.g., which may be expressed in revolutions per minute (RPM)). Moreover, the configuration and suitable equipment for performing the process described in connection with FIG. 9 may be used for spin coating (e.g., a process whereby as the substrate 906 is rotated, centrifugal force may accelerate a fluid 904 deposited on the substrate 906 across the substrate 906 surface from the substrate's center towards the substrate's edge). The fluid 904 may include a liquid such as a photoresist, a dielectric, an adhesive, a conductor, combinations thereof, and/or any other suitable material. In some embodiments, the fluid 904 may include a volatile component and a nonvolatile component. In addition to liquids, the fluid 904 may include a gas, a spray, a supercritical fluid, and/or the like.

The substrate 906 may include any suitable material having a radius, R, which may be designed to match the radius of an optical element (e.g., a compound retarder, a reflective polarizer, a partial reflector, and the like) on which the resulting azimuthal compensator is to be coupled. In at least one embodiment, the radial location on the substrate 906 may be described by the variable r, wherein $0 \leq r \leq R$.

In various embodiments, as shown in diagram 900, a fluid 904 may be deposited on the substrate 906. In one aspect, the fluid 904 may be dispensed from a fluid source 902, which may be positioned over the center of a stationary substrate 906. In other embodiments, the fluid 904 may be dispensed at another location on the substrate 906 with or without rotation.

After dispensing a suitable volume of fluid 904 (as shown and described in connection with diagram 900), the substrate 906 may be rotated at a first angular acceleration, $a_1$, causing a similar rotation of the fluid 904 to a rotating fluid 910 (as shown in diagram 901). This may cause a portion of the rotating fluid 910 to be pushed off of the surface of the substrate 906, thereby reducing the amount of rotating fluid 910 that is in contact with the surface substrate 906. Moreover, as shown in diagram 903, the substrate 906 may then be rotated at a first angular velocity, $v_1$, that may further cause a constant velocity rotation of the rotating fluid 912 and may also cause another portion of the rotating fluid 912 to be pushed off of the surface of the substrate 906, thereby further reducing the amount of rotating fluid 912 that is in contact with the surface substrate 906. In some embodiments, the fluid may include a volatile and a nonvolatile component. In at least one embodiment, as centrifugal forces spin the fluid 912, at least a portion of the volatile component may evaporate, thereby leaving a film of the nonvolatile component.

In diagram 905, the rotating fluid 912 of diagram 903 may then be brought to a stop to yield a first layer 914 over the substrate 906, and the resulting the first layer 914 may have a substantially uniform thickness. In some embodiments, the fluid of the first layer 914 may be left to sit or may be heated up (e.g., via radiation, not shown); this may further allow the volatile component to evaporate 916 from the first layer 914 thereby leaving a film of the nonvolatile component. Moreover, the fluid 904 may include a cross-linking component, and the application of radiation to the first layer 914 may cause the cross-linking component to cure and harden the first layer 914.

As illustrated in diagram 907, the fluid source 922 may then be repositioned from the center of the substrate 906 to a first radial location, $r_1$ (see, e.g., first radial location $r_1$ in FIG. 8). In various embodiments, another fluid 924 may be disposed using the fluid source 922, and the fluid 924 may include the same or a similar fluid as fluid 904 or a different fluid than fluid 904, which is shown and described in connection with diagram 900. In some examples, fluid 924 may also include a liquid such as a photoresist, a dielectric, an adhesive, a conductor, combinations thereof, and/or any other suitable material. In some embodiments, the fluid 924 may include a volatile component and a nonvolatile component. In addition to liquids, the fluid 924 may be a gas, a spray, a supercritical fluid, and/or the like.

As shown in diagram 909, after dispensing the fluid 924 onto the first layer 914, the substrate 906 may be accelerated at a second angular acceleration, $a_2$. The acceleration may include a step change in rotation, or it may change more smoothly. In some embodiments, the first, second, and/or subsequent angular acceleration may be unequal, but this is not necessarily so. Further, the second angular acceleration may cause a similar rotation of the fluid 924 to a rotating fluid 926, as shown in diagram 909, such that a portion of the rotating fluid 926 may be pushed off of the surface of the first layer 914, thereby reducing the amount of rotating fluid 926 that is in contact with the surface of the first layer 914.

Moreover, as shown in diagram 911, the substrate 906 may then be rotated at a second angular velocity, $v_2$, that may further cause a constant velocity rotation of the rotating fluid 928 and may also cause another portion of the rotating fluid 928 to be pushed off of the surface of the first layer 914, thereby further reducing the amount of rotating fluid 928 that is in contact with the surface of the first layer 914. In some embodiments, the fluid may include a volatile component and a nonvolatile component. As centrifugal forces spin up the rotating fluid 928, at least a portion of the volatile component may evaporate thereby leaving a film of the nonvolatile component.

In diagram 913, the rotating fluid 928 of diagram 911 may be brought to a stop to yield a second layer 930 over the first layer 914, where the second layer 930 may have a non-uniform thickness. In at least one embodiment, the fluid of the second layer 930 may be left to sit or may be heated up (e.g., via radiation, not shown); this may further allow the volatile component to evaporate 932 from the second layer 930 thereby leaving a film of the nonvolatile component. Moreover, the fluid 922 may include a cross-linking component, and the application of radiation to the second layer 930 may cause the cross-linking component to harden the second layer 930.

In some embodiments, there may be substantially none of the second layer 930 formed inside of an annular region defined by the fluid source 922. That is, the region covered by the first layer 914 may include an area defined by $0 \leq r \leq R$, and the region covered by the second layer 930 may include an area defined by $r_1 \leq r \leq R$.

The process illustrated in FIG. 9 may be repeated any number of times. For example, after repositioning the fluid source (e.g., fluid source similar to fluid source 922) to a second radial location, $r_2$ (see, e.g., second radial location $r_2$ in FIG. 8), the substrate 906 may accelerated to a third angular velocity, $v_3$, thereby forming a third layer (not shown) over the substrate 906. In at least one embodiment, the region covered by the third layer may be given by $r_2 \leq r \leq R$. Accordingly, by following the process illustrated in FIG. 9, a non-uniform film representing an azimuthal compensator may be formed over a substrate. In some embodiments, the non-uniform film may have a radial, or lateral, thickness gradient.

Further, embodiments described above may also include processing parameters such as incremental movements of the fluid source. Such movement combined with a corresponding rotation scheme may produce an azimuthal compensator including a layer having a lateral thickness gradient that may be stepwise continuous. Other embodiments may include ramped parameter transitions to produce a layer that includes a linear thickness gradient. In at least one embodiment, the layer thickness may increase from the center of the layer to the edge of the layer.

In some embodiments, processing parameters during formation of one or more layers may include solvent type or solvent-blend, solid-content, temperature, substrate surface treatment (e.g., surface energy), angular acceleration, rotation velocity, rotation duration or period, dispensing flow rate, dispensing location, distance of the fluid source from the substrate, and/or the like. In other embodiments, the rotation may be held constant for one or more dispensing steps. Still other embodiments may include clockwise and/or counterclockwise rotations.

For example, a first dispensing step (for example, as was shown and described in connection with diagram 900) may include accelerating a substrate clockwise to a first rotational velocity. The next step may include maintaining the first rotational velocity for a first period. It may thereafter be accelerated to a second rotational velocity. In an embodiment, the second rotational velocity may be opposite the first rotational velocity. The magnitudes of the first and second velocities may be the same or different.

The series of steps may further include one or more periods of no rotation. For example, a series of steps may include a period of clockwise rotation, a period of no rotation, and a period of either clockwise or counterclockwise rotation. In other embodiments, a clockwise rotation step may proceed substantially instantaneously to a counterclockwise rotation, with no pause between rotations. Rotational pauses or velocity changes may occur before, during, or after the dispensing of the fluid. In an embodiment, the duration of acceleration periods and constant rotation periods, may be up to several minutes, less than approximately 60 seconds, and/or less than approximately 10 seconds. Rotational velocities up to approximately 3000 RPM, or greater, may be included in some embodiments.

In various embodiments, the azimuthal compensator (e.g., azimuthal compensator 710 shown and described in connection with FIG. 7, above) may include a mesogenic component and/or a liquid crystal (LC) component. In at least one embodiment, the term "liquid crystal", "mesomorphic compound, or "mesogenic compound" (also referred to as "mesogen") may refer to a compound that under suitable conditions of temperature, pressure and concentration may exist as a mesophase or in particular as a LC phase. Non-amphiphilic mesogenic compounds may include for example one or more calamitic or discotic mesogenic groups. The term "mesogenic group" may refer to a group with the ability to induce LC phase behavior. Mesogenic groups, especially those of the non-amphiphilic type, may be calamitic or discotic. The compounds including mesogenic groups may not necessarily have to exhibit an LC phase themselves. It is also possible that compounds including mesogenic groups show LC phase behavior only in mixtures with other compounds, or when the mesogenic compounds or the mixtures thereof are polymerized. For the sake of simplicity, the term "liquid crystal" may be used herein for both mesogenic and LC materials. The term "reactive mesogen" (RM) may refer to a polymerizable mesogenic or liquid crystalline compound, which may be a monomeric compound.

In at least one embodiment, RMs and mixtures of RMs may be used to make azimuthal compensator films (e.g., similar to azimuthal compensator 710 shown and described in connection with FIG. 7), for example, through the process of in-situ polymerization. In some embodiments, the azimuthal compensator films may be prepared by coating a solution of an RM or of an RM mixture on a substrate, removing the solvent, aligning the RMs into the desired orientation, and polymerizing the coated and aligned RMs in situ by exposure to heat or actinic radiation (e.g., ultraviolet (UV) radiation), and optionally removing the polymerized film from the substrate. The film may then be applied to an optical component (e.g., a compound retarder, a reflective polarizer, a partial reflector, or the like), that is, an optical component made from a plastic material and having stress bi-refringence. In at least one embodiment, the RM may include an acrylate, a methacrylate, an epoxy, an oxetane, a vinyl-ether, a styrene, and/or a thiol.

In various embodiments, an azimuthal compensator film may be prepared by providing the RM formulation onto a substrate, aligning the RMs in the formulation into planar alignment (e.g., with long molecular axes of the RMs and LC molecules aligned in the plane of the substrate), and polymerizing the RM formulation in its LC phase at a selected temperature, for example by exposure to heat or actinic radiation to induce photopolymerization (e.g., UV photopolymerization), to fix the alignment of the LC molecules.

In at least one embodiment, polymerization of the RM formulation may be performed using an initiator absorbing at the wavelength of the actinic radiation. Accordingly, the RM formulation may additionally contain one or more polymerization initiators. For example, when polymerized by means of UV light, a photoinitiator may be used that decomposes under UV irradiation to produce free radicals or ions that start the polymerization reaction. For polymerizing RM formulations that include materials having acrylate or methacrylate groups, a radical photoinitiator may be used. For polymerizing RM formulations that include materials having vinyl, epoxide or oxetane groups, a cationic photoinitiator may be used. It is also possible to use a thermal polymerization initiator that decomposes when heated to produce free radicals or ions that start the polymerization.

In at least one embodiment, the RM formulation may additionally contain one or more surfactants. In some embodiments, the surfactants may be selected such that they promote planar surface alignment of the LC molecules when preparing the polymer film. The RM formulation may additionally include one or more additives, such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, degassing or de-foaming agents, deaerators, diluents, reactive diluents, auxiliaries, colorants, dyes, pigments, and/or nanoparticles.

In at least one embodiment, the RM formulation may be coated or otherwise applied onto a substrate where it may align into uniform orientation, planar alignment (i.e. with the long molecular axes of the RMs or LC molecules aligned in the plane of the substrate). Moreover, the RM formulation may be polymerized in situ in its LC phase at a selected temperature by, for example, exposure to heat or actinic radiation (e.g., by photo-polymerization such as UV-photopolymerization), in order to fix the alignment of the LC molecules. If necessary, uniform alignment may be promoted by additional means such as shearing and/or annealing the LC material, surface treatment of the substrate, and/or adding surfactants to the LC material.

In at least one embodiment, the substrate may include glass or quartz sheets and/or plastic films. In one aspect, a second substrate may be placed on top of the RM formulation coating prior to, during, and/or after polymerization. The substrates may be removed after polymerization or not. When using two substrates in case of curing by actinic radiation, at least one substrate may be at least partially transmissive for the actinic radiation used for the polymerization. In some embodiments, isotropic or birefringent substrates may be used. In at least one example, in case the substrate is not removed from the polymerized film after polymerization, isotropic substrates may be used.

Suitable plastic substrates for use in connection with the formation of an azimuthal compensator may include, but not be limited to, films of polyester such as polyethyleneterephthalate (PET) or polyethylene-naphthalate (PEN), polyvinylalcohol (PVA), polycarbonate (PC) or triacetylcellulose (TAC), and/or cyclic-olefin polymer films. In one aspect, uniaxially stretched plastic film may be used as birefringent substrates. In one aspect, the RMs and the other solid additives may be dissolved in a solvent. The solution may then be coated or printed onto the substrate, for example by spin-coating or printing and/or other known techniques, and the solvent may, for example, be evaporated off before polymerization. In many cases it may be suitable to heat the coated solution in order to facilitate the evaporation of the solvent.

In at least one embodiment, the RM formulation may be applied onto a substrate by conventional coating techniques like spin-coating or blade coating. Additionally or alternatively, the RM formulation may be applied to the substrate by conventional printing techniques, including, but not limited to, screen printing, offset printing, roll-to-roll printing, letter press printing, gravure printing, rotogravure printing, flexographic printing, intaglio printing, pad printing, heat-seal printing, ink-jet printing, and/or printing by means of a stamp and/or printing plate.

In one aspect, polymerization may be achieved by exposing the polymerizable material to heat and/or actinic radiation. Actinic radiation may include irradiation with light (e.g., UV light, IR light or visible light), irradiation with X-rays and/or gamma rays, and/or irradiation with high energy particles, such as ions and/or electrons. In at least one embodiment, a single UV lamp or a set of UV lamps may be used as a source for actinic radiation. When using a high lamp power the curing time may be reduced. Another possible source for actinic radiation may include a laser (e.g., a UV, IR or visible laser).

In various aspects, the curing time of the polymerizable material may depend on the reactivity of the RM formulation, the thickness of the coated layer, the type of polymerization initiator and the power of the UV lamp. The curing time may be approximately less than 5 minutes, less than 3 minutes, or less than 1 minute. In at least one embodiment, short curing times of less than 30 seconds may be used for mass production.

In one aspect, the polymerization process may not be limited to a single curing step. Rather it may be possible to carry out polymerization by two or more steps, in which the film is exposed to two or more lamps of the same type, and/or two or more different lamps in sequence. The curing temperature of different curing steps may be the same or different. The lamp power and dose from different lamps may also be the same or different. In one aspect, the polymerization may be carried out in air; however, polymerizing in an inert gas atmosphere like nitrogen and/or argon may also be possible.

While the azimuthal compensator and materials of the present disclosure has been described in connection with a ROC pancake lens block, the azimuthal compensator and material may be used in other fields. For example, the azimuthal compensator and materials may be used in optical, electrooptical, and/or electronic devices and/or components thereof. For example, they may be used as, a part of, and/or in combination with optical retardation films, polarizers, compensators, beam splitters, reflective films, alignment layers, color filters, antistatic protection sheets, and/or electromagnetic interference protection sheets, polarization controlled lenses for autostereoscopic 3D displays, and/or IR reflection films, and the like.

Figure 10:
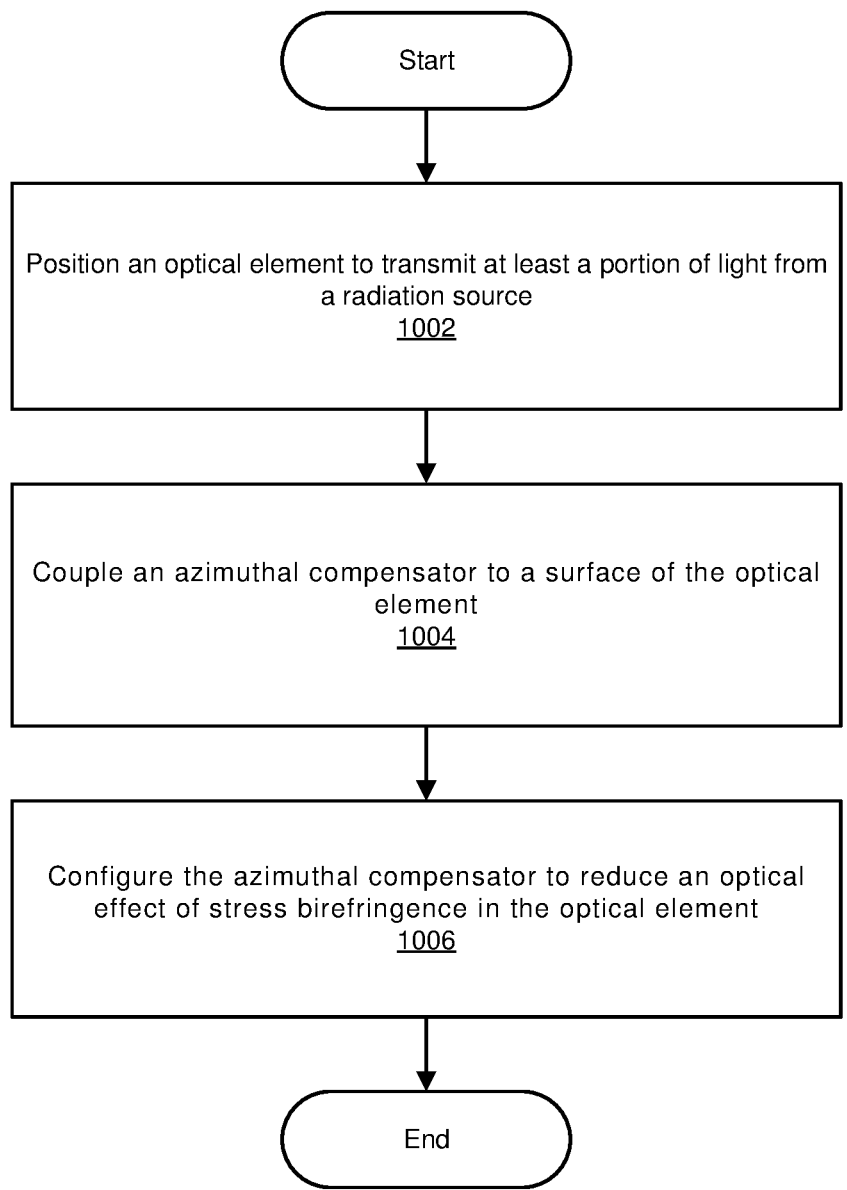
FIG. 10 shows a flow diagram of an example method for producing a pancake lens having azimuthal compensation, in accordance with at least one embodiment.

FIG. 10 shows a flow diagram of an example method for producing a pancake lens having azimuthal compensation, in accordance with example embodiments of the disclosure. At step 1002, an optical element may be positioned to transmit at least a portion of light from a radiation source, in accordance with various embodiments disclosed herein. In at least one embodiment, the radiation source may include a light source, such as an LED display, an OLED display, and/or an LCD display, and/or the like. In one aspect, the optical element may include a first retarder oriented to a first axis of orientation, where the first retarder may be configured to selectively transmit a portion of the radiation from the radiation source. The optical element may further include a partial reflector that may receive the portion of radiation from the first retarder and may transmit the portion of radiation. The optical element may also include a second retarder oriented to a second axis of orientation that is substantially orthogonal to the first axis of orientation, where the second retarder may be configured to transmit the portion of radiation from the partial reflector. The optical element may also include a reflective polarizer configured to reflect the portion of radiation transmitted by the second retarder back to the partial reflector through the second retarder. Further, the partial reflector may reflect a second portion of the radiation from the second retarder back to the reflective polarizer.

At step 1004 in FIG. 10, an azimuthal compensator may be coupled to a surface of the optical element, in accordance with various embodiments disclosed herein. In at least one embodiment, the azimuthal compensator may include a uniaxial birefringent material. In some examples, the azimuthal compensator may be coupled to a surface of the partial reflector and may be coupled to a surface of the second retarder. In various embodiments, a uniaxially birefringent material may include a slow axis corresponding to a direction where the material has a higher effective refractive index (e.g., called an extraordinary index $n_e$), resulting in a slower phase velocity of propagating light. Moreover, the birefringent material may include a fast axis corresponding to a direction where the material has a lower effective refractive index (e.g., called an ordinary index $n_o$). When light is incident on such a uniaxially birefringent material from another material (e.g., a plastic optical component material) with a lower refractive index, the incident light may split into a slow component propagating along the slow axis of the birefringent material and a fast component propagating along the fast axis of the birefringent material. Moreover, a ray of the slow component may be refracted more towards the normal (e.g., the optical axis of the system) than a ray of the fast component. In at least one embodiment, a uniaxially birefringent material may be classified as positive when the extraordinary index of refraction $n_e$ is greater than the ordinary index $n_o$. In other words, the polarization of the fast (or slow) portion of the incident light may be perpendicular to the optical axis when the birefringence of the crystal is positive (or negative, respectively).

At step 1006, the azimuthal compensator may be configured to reduce an optical effect of stress birefringence in the optical element, in accordance with various embodiments disclosed herein. In at least one embodiment, the azimuthal compensator may be configured to reduce an optical effect of stress birefringence in at least one of the partial reflector or the second retarder. In particular, the azimuthal compensator may include a slow axis, that may be circumferential (i.e. azimuthal). Moreover, the azimuthal compensator may include a slow axis that may be radial. Accordingly, the azimuthal compensator may slow down the light propagating via the radial axis to match the speed of the light propagating via the circumferential axis of a plastic component. In other words, the slow axis of the azimuthal compensator may be radial in direction and may increase with the increasing radius of the azimuthal compensator. Thus, the azimuthal compensator may have a fast axis that may be oriented in a direction perpendicular to a radius of the azimuthal compensator and a slow axis that may be parallel to the radius of the azimuthal compensator. Further, an amount of retardation provided by the azimuthal compensator may increase with an increasing radius of the azimuthal compensator.

Figure 11:
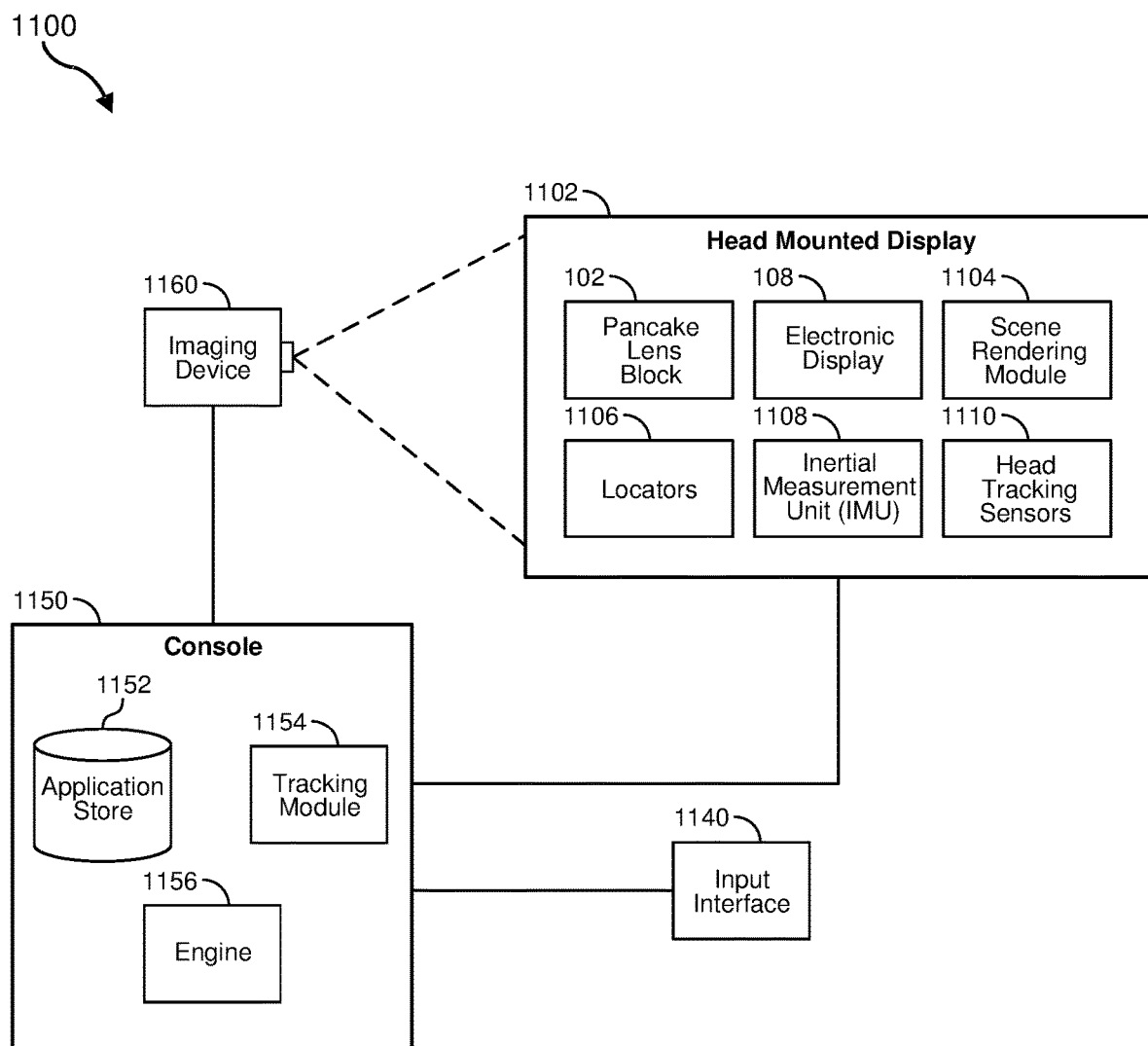
FIG. 11 shows a diagram of an example system environment in which a head-mounted display with a pancake lens operates, in accordance with at least one embodiment.

FIG. 11 is a block diagram of an exemplary system environment 1100 including an HMD 1102 that includes pancake lens block 102. System environment 1100 shown by FIG. 11 includes an HMD 1102, an imaging device 1160, and an input interface 1140 that are each coupled to a console 1150. While FIG. 11 shows an example system 1100 including one HMD 1102, one imaging device 1160, and one input interface 1140, in other embodiments any suitable number of these components may be included in the system 1100. For example, there may be multiple HMDs 1102, each having an associated input interface 1140 and being monitored by one or more imaging devices 1160, with each HMD 1102, input interface 1140, and imaging device 1160 communicating with the console 1150. In alternative configurations, different and/or additional components may be included in the system environment 1100. The system 1100 may operate in a system environment, an augmented reality (AR) system environment, a mixed reality (MR) system environment, or some combination thereof. In some embodiments, at least one of imaging device 1160, console 1150, and/or input interface 1140 may be included within HMD 1102 and/or may be external to HMD 1102.

HMD 1102 may present content to a user. Example content may include images, video, audio, or some combination thereof. Audio content may be presented via a separate device (e.g., speakers and/or headphones) external to HMD 1102 that receives audio information from HMD 1102, console 1150, or both. In some embodiments, HMD 1102 may include pancake lens block 102, an electronic display 108, locators 1106, an internal measurement unit (IMU) 1108, head tracking sensors 1110, and/or a scene rendering module 1104. In some embodiments, the HMD 1102 may present virtual reality (VR) elements, augmented reality (AR) elements, mixed reality (MR) elements, or some combination thereof to a user. In the AR and/or MR embodiments, the HMD 1102 may augment views of a physical, real-world environment with computer-generated elements (e.g., images, video, sound, etc.).

Electronic display screen 108 may present visual information (i.e., image light) from an electronic signal. The electronic display 108 may be, e.g., a liquid crystal display (LCD), an organic light emitting diode (OLED) display, an active-matrix organic light-emitting diode display (AMOLED), some type of flexible display, some combination thereof, and/or any other suitable type of emissive display. In some embodiments, electronic display screen 108 may include a linear polarizer and/or may admit light that is linearly polarized.

Pancake lens block 102 may direct light from electronic display 108 to an exit pupil for viewing by a user using one or more optical elements in addition to two curved optical elements (e.g., front optical element 104 and back optical element 106 described in reference to FIGS. 1-2). For example, the one or more optical elements may include at least one of apertures, Fresnel lenses, convex lenses, concave lenses, filters, and so forth, and may include combinations of different optical elements. In some embodiments, one or more of the optical elements of pancake lens block 102 may have one or more coatings, such as anti-reflective coatings. Magnification of the image light by pancake lens block 102 may allow electronic display 108 to be physically smaller, weigh less, and consume less power than larger displays. Additionally, magnification of the image light may increase a field of view of the displayed content. For example, the field of view of the displayed content may be such that the displayed content is presented using almost all (e.g., 150 degrees diagonal), and in some cases all, of the user's field of view.

Locators 1106 may represent objects located in specific positions on HMD 1102 relative to one another and relative to a specific reference point on HMD 1102. Locators 1106 may be, for example, a light emitting diode (LED), a corner cube reflector, a reflective marker, a type of light source that contrasts with an environment in which HMD 1102 operates, or some combination thereof. Active locators 1106 (e.g., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 1106 may be located beneath an outer surface of HMD 1102, which is transparent to the wavelengths of light emitted or reflected by locators 1106 or is thin enough to not substantially attenuate the wavelengths of light emitted or reflected by locators 1106. Further, the outer surface or other portions of HMD 1102 may be opaque in the visible band of wavelengths of light. Thus, locators 1106 may emit light in the IR band while under an outer surface of HMD 1102 that is transparent in the IR band but opaque in the visible band.

IMU 1108 may represent an electronic device that generates fast calibration data based on measurement signals received from one or more of head tracking sensors 1110, which generate one or more measurement signals in response to motion of HMD 1102. Examples of head tracking sensors 1110 include accelerometers, gyroscopes, magnetometers, other sensors suitable for detecting motion, correcting error associated with IMU 1108, or some combination thereof. Head tracking sensors 1110 may be located external to IMU 1108, internal to IMU 1108, or some combination thereof.

Based on the measurement signals from head tracking sensors 1110, IMU 1108 may generate fast calibration data indicating an estimated position of HMD 1102 relative to an initial position of HMD 1102. For example, head tracking sensors 1110 may include multiple accelerometers to measure translational motion (forward/back, up/down, left/right) and multiple gyroscopes to measure rotational motion (e.g., pitch, yaw, and roll). IMU 1108 may, for example, rapidly sample the measurement signals and calculate the estimated position of HMD 1102 from the sampled data. For example, IMU 1108 may integrate measurement signals received from the accelerometers over time to estimate a velocity vector and integrate the velocity vector over time to determine an estimated position of a reference point on HMD 1102. The reference point may represent a point that may be used to describe the position of HMD 1102. While the reference point may generally be defined as a point in space, in various embodiments, reference point may be defined as a point within HMD 1102 (e.g., a center of the IMU 1108). Alternatively, IMU 1108 may provide the sampled measurement signals to console 1150, which determines the fast calibration data.

IMU 1108 may additionally receive one or more calibration parameters from console 1150. As further discussed below, the one or more calibration parameters may be used to maintain tracking of HMD 1102. Based on a received calibration parameter, IMU 1108 may adjust one or more IMU parameters (e.g., sample rate). In some embodiments, certain calibration parameters may cause IMU 1108 to update an initial position of the reference point to correspond to a next calibrated position of the reference point. Updating the initial position of the reference point as the next calibrated position of the reference point may help reduce accumulated error associated with determining the estimated position. This accumulated error, also referred to as drift error, may cause the estimated position of the reference point to "drift" away from the actual position of the reference point over time.

Scene rendering module 1104 may receive content for the virtual scene from engine 1156 and provide the content for display on electronic display 108. Additionally, scene rendering module 1104 may adjust the content based on information IMU 1108 and head tracking sensors 1110. For example, upon receiving the content from engine 1156, scene rendering module 1104 may adjust the content based on the predicted state (i.e., eye position and focal length) of pancake lens block 102 received from a focus prediction module. Additionally, scene rendering module 1104 may determine a portion of the content to be displayed on electronic display 108 based on one or more of tracking module 1154, head tracking sensors 1110, or IMU 1108, as described further below.

Imaging device 1160 may generate slow calibration data in accordance with calibration parameters received from console 1150. Slow calibration data may include one or more images showing observed positions of locators 1106 that are detectable by imaging device 1160. Imaging device 1160 may include one or more cameras, one or more video cameras, other devices capable of capturing images including one or more locators 1106, or some combination thereof. Additionally, imaging device 1160 may include one or more filters (e.g., for increasing signal to noise ratio). Imaging device 1160 may be configured to detect light emitted or reflected from locators 1106 in a field of view of imaging device 1160. In embodiments where locators 1106 include passive elements (e.g., a retroreflector), imaging device 1160 may include a light source that illuminates some or all of locators 1106, which retro-reflect the light towards the light source in imaging device 1160. Slow calibration data may be communicated from imaging device 1160 to console 1150, and imaging device 1160 may receive one or more calibration parameters from console 1150 to adjust one or more imaging parameters (e.g., focal length, focus, frame rate, ISO, sensor temperature, shutter speed, aperture, etc.).

Input interface 1140 may represent a device that allows a user to send action requests to console 1150. An action request may represent a request to perform a particular action. For example, an action request may be to start or end an application or to perform a particular action within the application. Input interface 1140 may include one or more input devices. Example input devices include a keyboard, a mouse, a game controller, and/or any other suitable device for receiving action requests and communicating the received action requests to console 1150. An action request received by input interface 1140 may be communicated to console 1150, which performs an action corresponding to the action request. In some embodiments, input interface 1140 may provide haptic feedback to the user in accordance with instructions received from console 1150. For example, haptic feedback may be provided by the input interface 1140 when an action request is received and/or console 1150 communicate instructions to input interface 1140 causing input interface 1140 to generate haptic feedback when console 1150 performs an action.

Console 1150 may provide content to HMD 1102 for presentation to the user in accordance with information received from imaging device 1160, HMD 1102, or input interface 1140. In the example shown in FIG. 11, console 1150 may include an application store 1152, a tracking module 1154, and an engine 1156. Some embodiments of console 1150 may have different or additional modules than those described in conjunction with FIG. 11. Similarly, the functions further described below may be distributed among components of console 1150 in a different manner than is described herein.

Application store 1152 may store one or more applications for execution by console 1150. An application may represent a group of instructions, that when executed by a processor, generates content for presentation to the user. Content generated by an application may be in response to inputs received from the user via movement of HMD 1102 or interface device 1140. Examples of applications include gaming applications, conferencing applications, video playback application, or other suitable applications.

Tracking module 1154 may calibrate the system using one or more calibration parameters and may adjust one or more calibration parameters to reduce error in determining position of HMD 1102. For example, tracking module 1154 may adjust the focus of imaging device 1160 to obtain a more accurate position for observed locators 1106 on HMD 1102. Moreover, calibration performed by tracking module 1154 may also account for information received from IMU 1108. Additionally, if tracking of HMD 1102 is lost (e.g., imaging device 1160 loses line of sight of at least a threshold number of locators 1106), tracking module 1154 may re-calibrate some or all of the system components.

Additionally, tracking module 1154 may track the movement of HMD 1102 using, for example, slow calibration information from imaging device 1160 and may determine positions of a reference point on HMD 1102 using observed locators from the slow calibration information and a model of HMD 1102. Tracking module 1154 may additionally or alternatively determine positions of the reference point on HMD 1102 using position information from fast calibration information from IMU 1108 on HMD 1102. Additionally, tracking module 1154 may use portions of the fast calibration information, the slow calibration information, some combination thereof, and/or any other suitable positional information to predict a future location of HMD 1102, which is provided to engine 1156.

Engine 1156 may execute applications within the system and receive position information, acceleration information, velocity information, predicted future positions, some combination thereof, and/or any other suitable data for HMD 1102 from tracking module 1154. Based on the received information, engine 1156 may determine content to provide to HMD 1102 for presentation to the user, such as a virtual scene. For example, if the received information indicates that the user has looked to the left, engine 1156 may generate content for HMD 1102 that includes optical elements or tracks the user's movement in a virtual environment. Additionally or alternatively, engine 1156 may perform an action within an application executing on console 1150 in response to an action request received from the input interface 1140 and provide feedback to the user that the action was performed. The provided feedback may, for example, be visual or audible feedback via HMD 1102 and/or haptic feedback via input interface 1140.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As detailed above, the computing devices, display devices, and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A pancake lens block, comprising:
   a plurality of optical elements configured to transmit at least a portion of radiation from a radiation source, wherein the plurality of optical elements comprises:
   a partial reflector; and
   a retarder is configured to convert the portion of radiation from one polarization state to another polarization state;
   a spatially patterned optical retardation film coupled between the partial reflector and the retarder, wherein the spatially patterned optical retardation film:
   comprises a reactive mesogen having a uniaxial birefringence;
   comprises a layer having a thickness that varies in a radial direction; and
   is configured to reduce an optical effect of stress birefringence in the plurality of optical elements;
   a reflective polarizer configured to reflect the portion of radiation to the partial reflector through the retarder, where the partial reflector reflects a second portion of the radiation from the retarder back to the reflective polarizer; and
   an eye-reflection reduction portion configured to:
   receive the second portion of radiation from the reflective polarizer after the second portion of the radiation has passed through the retarder; and
   reduce back reflections emanating from an eye of a user, the eye-reflection reduction portion comprising:
   a polarizer;
   a compound retarder comprising a stack of at least three quarter wave plates; and
   an anti-reflective material.

2. The pancake lens block of claim 1, wherein:
   the retarder is oriented to a first axis of orientation, where the retarder is configured to selectively transmit the portion of radiation from the radiation source;
   the partial reflector receives the portion of radiation from the retarder and transmits the portion of radiation; and
   the plurality of optical elements further comprise:
   a second retarder oriented to a second axis of orientation that is substantially orthogonal to the first axis of orientation, where the second retarder is configured to transmit the portion of radiation from the partial reflector.

3. The pancake lens block of claim 2, wherein at least one of the second retarder or the partial reflector comprises a plastic lens.

4. The pancake lens block of claim 3, wherein the plastic lens is fabricated using an injection molding process.

5. The pancake lens block of claim 3, wherein the plastic lens comprises a material whose stress optical coefficient is higher than a stress optical coefficient of a cyclic olefin material.

6. The pancake lens block of claim 3, wherein the spatially patterned optical retardation film has a maximum thickness that is approximately equal to a thickness of the plastic lens.

7. The pancake lens block of claim 1, wherein an amount of retardation provided by the spatially patterned optical retardation film increases with an increasing radius of the spatially patterned optical retardation film.

8. The pancake lens block of claim 1, wherein the spatially patterned optical retardation film is fabricated using a non-uniform spin coating process.

9. The pancake lens block of claim 8, wherein the non-uniform spin coating process comprises:
   dispensing a fluid from a fluid source onto a surface of a substrate at a first radial position while spinning the substrate at a first angular velocity; and
   dispensing the fluid from the fluid source onto the substrate's surface at a second radial position while spinning the substrate at a second angular velocity.

10. The pancake lens block of claim 9, wherein the fluid comprises a volatile component and a nonvolatile component, and the volatile component evaporates from the substrate's surface yielding a film on the substrate's surface, the film comprising the nonvolatile component.

11. The pancake lens block of claim 1, wherein the reactive mesogen comprises at least one of an acrylate, a methacrylate, an epoxy, an oxetane, a vinyl-ether, a styrene, or a thiol.

12. The pancake lens block of claim 1, wherein the reactive mesogen has pre-tilt that changes with an increasing radius of the layer.

13. A head mounted display (HMD) comprising:
   an electronic display configured to emit light; and
   a pancake lens block comprising:
   a plurality of optical elements configured to transmit at least a portion of the light emitted by the electronic display, wherein the plurality of optical elements comprises:
   a partial reflector; and
   a retarder is configured to convert the portion of light from one polarization state to another polarization state; and
   a spatially patterned optical retardation film coupled between the partial reflector and the retarder, wherein the spatially patterned optical retardation film:

comprises a reactive mesogen having a uniaxial birefringence;

comprises a layer having a thickness that varies in a radial direction; and is configured to reduce an optical effect of stress birefringence in the plurality of optical elements;

a reflective polarizer configured to reflect the portion of light to the partial reflector through the retarder, where the partial reflector reflects a second portion of the light from the retarder back to the reflective polarizer; and an eye-reflection reduction portion configured to:

receive the second portion of light from the reflective polarizer after the second portion of light has passed through the retarder; and reduce back reflections emanating from an eye of a user, the eye-reflection reduction portion comprising:

a polarizer;

a compound retarder comprising a stack of at least three quarter wave plates; and an anti-reflective material.

14. The HMD of claim 13, wherein:

the retarder is oriented to a first axis of orientation, where the retarder is configured to selectively transmit the portion of light emitted by the electronic display;

the partial reflector receives the portion of light from the retarder and transmits the portion of light; and the plurality of optical elements further comprise:

a second retarder oriented to a second axis of orientation that is substantially orthogonal to the first axis of orientation, where the second retarder is configured to transmit the portion of light from the partial reflector.

15. A method of assembling a pancake lens block, the method comprising:

positioning a plurality of optical elements to transmit at least a portion of light from a radiation source, wherein the plurality of optical elements comprises:

a partial reflector; and a retarder is configured to convert the portion of light from one polarization state to another polarization state;

coupling a spatially patterned optical retardation film between the partial reflector and the retarder, wherein the spatially patterned optical retardation film:

comprises a reactive mesogen having a uniaxial birefringence;

comprises a layer having a thickness that varies in a radial direction; and is configured to reduce an optical effect of stress birefringence in the plurality of optical elements;

configuring a reflective polarizer to reflect the portion of light to the partial reflector through the retarder, where the partial reflector reflects a second portion of the light from the retarder back to the reflective polarizer; and configuring an eye-reflection reduction portion to:

receive the second portion of light from the reflective polarizer after the second portion of light has passed through the retarder; and reduce back reflections emanating from an eye of a user, the eye-reflection reduction portion comprising:

a polarizer;

a compound retarder comprising a stack of at least three quarter wave plates; and an anti-reflective material.

16. The method of claim 15, further comprising fabricating the spatially patterned optical retardation film using a non-uniform spin coating process.

* * * * *

UNITED STATES PATENT AND TRADEMARK OFFICE
CERTIFICATE OF CORRECTION

| | |
|---|---|
| PATENT NO. | : 11,226,482 B2 |
| APPLICATION NO. | : 16/159747 |
| DATED | : January 18, 2022 |
| INVENTOR(S) | : Sharp |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 156 days.

Signed and Sealed this
Twenty-ninth Day of November, 2022

*Katherine Kelly Vidal*

Katherine Kelly Vidal
*Director of the United States Patent and Trademark Office*